US010366385B1

(12) United States Patent
Ramalingam

(10) Patent No.: US 10,366,385 B1
(45) Date of Patent: Jul. 30, 2019

(54) MOBILE PAYMENTS USING POINT-OF-SALE INFRASTRUCTURE

(71) Applicant: Amazon Technologies, Inc., Seattle, WA (US)

(72) Inventor: Harsha Ramalingam, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 271 days.

(21) Appl. No.: 15/494,387

(22) Filed: Apr. 21, 2017

Related U.S. Application Data

(63) Continuation of application No. 13/468,714, filed on May 10, 2012, now Pat. No. 9,697,508, which is a
(Continued)

(51) Int. Cl.
*G06Q 20/00* (2012.01)
*G06Q 20/34* (2012.01)
(Continued)

(52) U.S. Cl.
CPC ............ *G06Q 20/34* (2013.01); *G06Q 20/20* (2013.01); *G06Q 20/325* (2013.01)

(58) Field of Classification Search
CPC ........ G06Q 20/00; G06Q 20/20; G06Q 20/34; G06Q 20/325
(Continued)

(56) References Cited

U.S. PATENT DOCUMENTS

| 5,914,472 A | 6/1999 | Foladare et al. |
| 6,108,650 A | 8/2000 | Musk et al. |

(Continued)

FOREIGN PATENT DOCUMENTS

| CN | 101689268 | 3/2010 |
| CN | 101919274 | 12/2010 |

(Continued)

OTHER PUBLICATIONS

Using Your Starbucks Card is Now Even Faster and Easier With the Starbucks Card Mobile App, Starbucks Card Mobile App, http://www.starbucks.com/coffeehouse/mobile-apps/starbucks-card-mobile, Apr. 22, 2010, pp. 1-2.
(Continued)

*Primary Examiner* — Andrew Joseph Rudy
(74) *Attorney, Agent, or Firm* — Kilpatrick Townsend & Stockton LLP

(57) ABSTRACT

Existing infrastructure for processing credit card transactions at point-of-sale (POS) devices is leveraged to provide secure and convenient payment with a mobile device. A mobile transaction infrastructure that is integrated with the credit card interchange network receives information from the mobile device and passes this information to a gateway provider or a payment processor. By combining information from both the mobile device and the POS device, this backend infrastructure can uniquely identify a transaction and appropriately charge an account associated with the user of the mobile device. The transaction may be matched with the mobile device be based on location, time, transaction charge, and/or other factors.

20 Claims, 11 Drawing Sheets

Related U.S. Application Data continuation of application No. 12/976,533, filed on Dec. 22, 2010, now abandoned.

(60) Provisional application No. 61/351,743, filed on Jun. 4, 2010, provisional application No. 61/316,527, filed on Mar. 23, 2010.

(51) Int. Cl.
    *G06Q 20/20*     (2012.01)
    *G06Q 20/32*     (2012.01)

(58) Field of Classification Search
    USPC ............ 705/16, 17, 26.1; 455/414.1, 432.1, 455/456.1, 456.6; 235/376–380
    See application file for complete search history.

(56) References Cited

U.S. PATENT DOCUMENTS

| | | |
|---|---|---|
| 6,173,269 B1 | 1/2001 | Solokl et al. |
| 6,327,348 B1 | 12/2001 | Walker et al. |
| 6,343,279 B1 | 1/2002 | Bissonette et al. |
| 6,505,046 B1 | 1/2003 | Baker |
| 6,597,770 B2 | 7/2003 | Walker et al. |
| 6,738,749 B1 | 5/2004 | Chasko |
| 6,756,879 B2 | 6/2004 | Shuster |
| 7,392,534 B2 | 6/2008 | Lu et al. |
| 7,434,723 B1 | 10/2008 | White et al. |
| 7,657,489 B2 | 2/2010 | Stambaugh |
| 7,725,390 B2 | 5/2010 | Plant |
| 7,739,197 B2 | 6/2010 | Jambunathan et al. |
| 7,788,281 B2 | 8/2010 | Cole et al. |
| 7,813,717 B2 | 10/2010 | Huotari et al. |
| 7,840,222 B2 | 11/2010 | Hampel et al. |
| 7,853,786 B1 | 12/2010 | Fultz et al. |
| 7,873,708 B2 | 1/2011 | Durand et al. |
| 7,899,742 B2 | 3/2011 | Benkert et al. |
| 7,900,847 B2 | 3/2011 | Kaiser et al. |
| 8,050,991 B2 | 11/2011 | Popovic et al. |
| 8,099,109 B2 | 1/2012 | Altman et al. |
| 8,116,731 B2 | 2/2012 | Buhrmann et al. |
| 8,135,624 B1 | 3/2012 | Ramalingam et al. |
| 8,140,403 B2 | 3/2012 | Ramalingam et al. |
| 8,213,898 B2 | 7/2012 | Choti et al. |
| 8,255,698 B2 | 8/2012 | Li et al. |
| 8,326,767 B1 | 12/2012 | Ramanujan et al. |
| 8,341,029 B1 | 12/2012 | Ramalingam et al. |
| 8,401,906 B2 * | 3/2013 | Ruckart ................ G06Q 20/12 235/380 |
| 8,447,651 B1 | 5/2013 | Scholl et al. |
| 8,521,131 B1 | 8/2013 | Ramalingam et al. |
| 8,606,322 B2 | 12/2013 | Sabol |
| 8,611,919 B2 * | 12/2013 | Barnes, Jr. ......... G06Q 10/1053 455/456.1 |
| 8,744,488 B2 | 6/2014 | Cousins et al. |
| 8,761,809 B2 * | 6/2014 | Faith .................... G06F 1/1694 455/456.6 |
| 8,849,310 B2 | 9/2014 | Fan et al. |
| 8,863,307 B2 | 10/2014 | Sorek |
| 9,058,604 B2 | 6/2015 | Carr et al. |
| 9,107,064 B1 | 8/2015 | Ramalingam et al. |
| 9,262,370 B2 * | 2/2016 | Hofstaedter ......... G06F 15/173 |
| 2001/0025257 A1 | 9/2001 | Sato |
| 2001/0051911 A1 | 12/2001 | Marks et al. |
| 2002/0046116 A1 | 4/2002 | Hohle et al. |
| 2002/0065713 A1 | 5/2002 | Awada et al. |
| 2002/0077876 A1 | 6/2002 | O'Meara et al. |
| 2002/0091568 A1 | 7/2002 | Kraft et al. |
| 2002/0123938 A1 | 9/2002 | Yu et al. |
| 2002/0133467 A1 | 9/2002 | Hobson et al. |
| 2002/0143638 A1 | 10/2002 | August et al. |
| 2003/0159066 A1 | 8/2003 | Staw et al. |
| 2003/0208386 A1 | 11/2003 | Brondrup |
| 2003/0208684 A1 | 11/2003 | Camacho et al. |
| 2003/0212609 A1 | 11/2003 | Blair et al. |
| 2003/0220835 A1 | 11/2003 | Barnes, Jr. |
| 2004/0002897 A1 | 1/2004 | Vishik |
| 2004/0019563 A1 | 1/2004 | Sines et al. |
| 2004/0039694 A1 | 2/2004 | Dunn et al. |
| 2004/0056101 A1 | 3/2004 | Barkan et al. |
| 2004/0093620 A1 | 5/2004 | Iino et al. |
| 2005/0004840 A1 | 1/2005 | Wanninger |
| 2005/0021773 A1 | 1/2005 | Shiga et al. |
| 2005/0177442 A1 | 8/2005 | Sullivan et al. |
| 2005/0221843 A1 | 10/2005 | Friedman et al. |
| 2005/0228719 A1 | 10/2005 | Roberts et al. |
| 2005/0234771 A1 | 10/2005 | Register et al. |
| 2005/0240472 A1 | 10/2005 | Postrel |
| 2005/0267812 A1 | 12/2005 | Jensen et al. |
| 2005/0288719 A1 | 12/2005 | Zhang et al. |
| 2006/0047576 A1 | 3/2006 | Aaltonen et al. |
| 2006/0111955 A1 | 5/2006 | Winter et al. |
| 2006/0235795 A1 | 10/2006 | Johnson et al. |
| 2006/0235796 A1 | 10/2006 | Johnson et al. |
| 2006/0242017 A1 | 10/2006 | Libes et al. |
| 2007/0084913 A1 | 4/2007 | Weston |
| 2007/0088610 A1 | 4/2007 | Chen |
| 2007/0118426 A1 | 5/2007 | Barnes, Jr. |
| 2007/0136140 A1 | 6/2007 | Smith, Jr. |
| 2007/0291710 A1 | 12/2007 | Fadell |
| 2008/0004949 A1 | 1/2008 | Flake et al. |
| 2008/0005104 A1 | 1/2008 | Flake et al. |
| 2008/0010121 A1 | 1/2008 | McIntosh |
| 2008/0027810 A1 | 1/2008 | Lerner et al. |
| 2008/0040233 A1 | 2/2008 | Wildman et al. |
| 2008/0040274 A1 | 2/2008 | Uzo |
| 2008/0086767 A1 | 4/2008 | Kulkarni et al. |
| 2008/0140522 A1 | 6/2008 | Tutone |
| 2008/0154654 A1 | 6/2008 | Niessen et al. |
| 2008/0154765 A1 | 6/2008 | Wolfe |
| 2008/0154847 A1 | 6/2008 | Chellapilla et al. |
| 2008/0167991 A1 | 7/2008 | Carlson et al. |
| 2008/0183576 A1 | 7/2008 | Kim et al. |
| 2008/0183675 A1 | 7/2008 | Schwarz |
| 2008/0201226 A1 | 8/2008 | Carlson et al. |
| 2008/0208739 A1 | 8/2008 | Phillips |
| 2008/0215475 A1 | 9/2008 | Ramer et al. |
| 2008/0221997 A1 | 9/2008 | Wolfe |
| 2008/0228600 A1 | 9/2008 | Treyz et al. |
| 2008/0262928 A1 | 10/2008 | Michaelis |
| 2008/0268868 A1 | 10/2008 | Maitland |
| 2008/0275768 A1 | 11/2008 | Berman et al. |
| 2008/0281677 A1 | 11/2008 | Toms et al. |
| 2008/0281702 A1 | 11/2008 | Kirkwood |
| 2008/0318559 A1 | 12/2008 | Porco |
| 2009/0005973 A1 | 1/2009 | Salo et al. |
| 2009/0006203 A1 | 1/2009 | Fordyce, III et al. |
| 2009/0024477 A1 | 1/2009 | Kramer et al. |
| 2009/0024700 A1 | 1/2009 | Garg et al. |
| 2009/0030779 A1 | 1/2009 | Tollinger et al. |
| 2009/0061884 A1 | 3/2009 | Rajan et al. |
| 2009/0076896 A1 | 3/2009 | DeWitt et al. |
| 2009/0076925 A1 | 3/2009 | DeWitt et al. |
| 2009/0125380 A1 | 5/2009 | Otto et al. |
| 2009/0125396 A1 | 5/2009 | Otto et al. |
| 2009/0132417 A1 | 5/2009 | Scipioni et al. |
| 2009/0138302 A1 | 5/2009 | Breznik et al. |
| 2009/0143966 A1 | 6/2009 | Jacobson et al. |
| 2009/0150218 A1 | 6/2009 | Brunner et al. |
| 2009/0152343 A1 | 6/2009 | Carter et al. |
| 2009/0157547 A1 | 6/2009 | Ruckart |
| 2009/0187463 A1 | 7/2009 | DaCosta |
| 2009/0187466 A1 | 7/2009 | Carter et al. |
| 2009/0187488 A1 | 7/2009 | Shamilian |
| 2009/0187492 A1 | 7/2009 | Hammad et al. |
| 2009/0198607 A1 | 8/2009 | Badger et al. |
| 2009/0216646 A1 | 8/2009 | Seven et al. |
| 2009/0222346 A1 | 9/2009 | Greene et al. |
| 2009/0228325 A1 | 9/2009 | Simmons et al. |
| 2009/0240582 A1 | 9/2009 | Sheldon-Neal et al. |
| 2009/0240622 A1 | 9/2009 | Zandonadi |
| 2009/0253408 A1 | 10/2009 | Fitzgerald et al. |
| 2009/0254930 A1 | 10/2009 | Lo et al. |

(56) References Cited

U.S. PATENT DOCUMENTS

| | | |
|---|---|---|
| 2009/0271275 A1 | 10/2009 | Regmi et al. |
| 2009/0281945 A1 | 11/2009 | Shakkarwar |
| 2009/0287558 A1 | 11/2009 | Seth et al. |
| 2009/0292642 A1 | 11/2009 | Han |
| 2009/0299857 A1 | 12/2009 | Brubaker |
| 2009/0313129 A1 | 12/2009 | Rothschild |
| 2009/0327135 A1 | 12/2009 | Nguyen et al. |
| 2009/0327151 A1 | 12/2009 | Carlson et al. |
| 2010/0004997 A1 | 1/2010 | Mehta et al. |
| 2010/0006641 A1 | 1/2010 | Boutcher et al. |
| 2010/0006642 A1 | 1/2010 | Boutcher et al. |
| 2010/0030592 A1 | 2/2010 | Evans et al. |
| 2010/0030651 A1 | 2/2010 | Matotek et al. |
| 2010/0032339 A1 | 2/2010 | Hasegawa et al. |
| 2010/0041419 A1 | 2/2010 | Svendsen et al. |
| 2010/0042421 A1 | 2/2010 | Bai et al. |
| 2010/0049615 A1 | 2/2010 | Rose et al. |
| 2010/0057530 A1 | 3/2010 | Parivash et al. |
| 2010/0063891 A1 | 3/2010 | Townsend et al. |
| 2010/0070334 A1 | 3/2010 | Monteverde |
| 2010/0070365 A1 | 3/2010 | Siotia et al. |
| 2010/0076829 A1 | 3/2010 | Bishop |
| 2010/0076849 A1 | 3/2010 | Bishop |
| 2010/0077036 A1 | 3/2010 | DeLuca et al. |
| 2010/0082420 A1 | 4/2010 | Trifiletti et al. |
| 2010/0082445 A1 | 4/2010 | Hodge et al. |
| 2010/0088188 A1 | 4/2010 | Kumar et al. |
| 2010/0100454 A1 | 4/2010 | Sines et al. |
| 2010/0106611 A1 | 4/2010 | Paulsen et al. |
| 2010/0114775 A1 | 5/2010 | Griffin |
| 2010/0121717 A1 | 5/2010 | Chen |
| 2010/0138294 A1 | 6/2010 | Bussmann et al. |
| 2010/0138344 A1 | 6/2010 | Wong et al. |
| 2010/0145723 A1 | 6/2010 | Hudson et al. |
| 2010/0145778 A1 | 6/2010 | Fordyce, III et al. |
| 2010/0146607 A1 | 6/2010 | Piepenbrink et al. |
| 2010/0156933 A1 | 6/2010 | Jones et al. |
| 2010/0169179 A1 | 7/2010 | Ramer et al. |
| 2010/0190510 A1 | 7/2010 | Maranhas et al. |
| 2010/0191551 A1 | 7/2010 | Drance et al. |
| 2010/0191578 A1 | 7/2010 | Tran et al. |
| 2010/0192230 A1 | 7/2010 | Steeves et al. |
| 2010/0205167 A1 | 8/2010 | Tunstall-Pedoe et al. |
| 2010/0217525 A1 | 8/2010 | King et al. |
| 2010/0223184 A1 | 9/2010 | Perlman |
| 2010/0241495 A1 | 9/2010 | Maniyar et al. |
| 2010/0241496 A1 | 9/2010 | Gupta et al. |
| 2010/0250368 A1 | 9/2010 | Porco |
| 2010/0257054 A1 | 10/2010 | Martin et al. |
| 2010/0260388 A1 | 10/2010 | Garrett et al. |
| 2010/0262449 A1 | 10/2010 | Monteforte et al. |
| 2010/0274655 A1 | 10/2010 | Postrel |
| 2010/0293065 A1 | 11/2010 | Brody et al. |
| 2010/0306099 A1 | 12/2010 | Hirson et al. |
| 2010/0312630 A1 | 12/2010 | Krutchik et al. |
| 2010/0312645 A1 | 12/2010 | Niejadlik et al. |
| 2010/0312646 A1 | 12/2010 | Gupta et al. |
| 2010/0323716 A1 | 12/2010 | Jaffri |
| 2010/0324977 A1 | 12/2010 | Dragt |
| 2010/0332339 A1 | 12/2010 | Patel et al. |
| 2011/0010238 A1 | 1/2011 | Postrel |
| 2011/0015987 A1 | 1/2011 | Chakraborty et al. |
| 2011/0022424 A1 | 1/2011 | VonDerheide |
| 2011/0022483 A1 | 1/2011 | Hammad |
| 2011/0022517 A1 | 1/2011 | Hammad |
| 2011/0029403 A1 | 2/2011 | Xu |
| 2011/0053559 A1 | 3/2011 | Klein |
| 2011/0055005 A1 | 3/2011 | Lang |
| 2011/0057027 A1 | 3/2011 | Grossman et al. |
| 2011/0060640 A1 | 3/2011 | Thompson et al. |
| 2011/0065419 A1 | 3/2011 | Book et al. |
| 2011/0082735 A1 | 4/2011 | Kannan et al. |
| 2011/0087430 A1 | 4/2011 | Boss et al. |
| 2011/0093318 A1 | 4/2011 | Guday et al. |
| 2011/0106613 A1 | 5/2011 | Felt et al. |
| 2011/0112892 A1 | 5/2011 | Tarantino |
| 2011/0131627 A1 | 6/2011 | Abendroth et al. |
| 2011/0137804 A1 | 6/2011 | Peterson |
| 2011/0140841 A1 | 6/2011 | Bona et al. |
| 2011/0184793 A1 | 7/2011 | Bohannon et al. |
| 2011/0189981 A1 | 8/2011 | Faith et al. |
| 2011/0191152 A1 | 8/2011 | Schwartz |
| 2011/0191161 A1 | 8/2011 | Dai |
| 2011/0191237 A1 | 8/2011 | Faith et al. |
| 2011/0202416 A1 | 8/2011 | Buer et al. |
| 2011/0238474 A1 | 9/2011 | Carr et al. |
| 2011/0238476 A1 | 9/2011 | Carr et al. |
| 2011/0238514 A1 | 9/2011 | Ramalingam et al. |
| 2011/0238517 A1 | 9/2011 | Ramalingam et al. |
| 2011/0270618 A1 | 11/2011 | Banerjee et al. |
| 2011/0289004 A1 | 11/2011 | Prakash et al. |
| 2011/0302016 A1 | 12/2011 | Haddad |
| 2012/0010931 A1 | 1/2012 | Mehra et al. |
| 2012/0010938 A1 | 1/2012 | Standley et al. |
| 2012/0185317 A1 | 7/2012 | Wong |
| 2012/0246003 A1 | 9/2012 | Hart et al. |
| 2012/0259722 A1 | 10/2012 | Mikurak |
| 2012/0323703 A1 | 12/2012 | Hillier |

FOREIGN PATENT DOCUMENTS

| | | |
|---|---|---|
| JP | 2000134147 | 5/2000 |
| JP | 2001222593 | 8/2001 |
| JP | 2001357337 | 12/2001 |
| JP | 2002099971 | 4/2002 |
| JP | 2002175354 | 7/2002 |
| JP | 2002288502 | 10/2002 |
| JP | 2003022481 | 1/2003 |
| JP | 2003090730 | 3/2003 |
| JP | 2004264986 | 9/2004 |
| JP | 2004341684 | 12/2004 |
| JP | 2006164189 | 6/2006 |
| JP | 2007208444 | 8/2007 |
| JP | 2007522564 | 8/2007 |
| JP | 2008022395 | 1/2008 |
| JP | 2008199221 | 8/2008 |
| JP | 2009020036 | 1/2009 |
| JP | 2009205684 | 9/2009 |
| JP | 2009224868 | 10/2009 |
| JP | 2009538093 | 10/2009 |
| JP | 2009282618 | 12/2009 |
| JP | 2009283989 | 12/2009 |
| JP | 2011188256 | 9/2011 |
| JP | 2012510681 | 5/2012 |
| JP | 2012529085 | 11/2012 |
| KR | 1020070105106 | 10/2007 |
| KR | 1020090080000 | 7/2009 |
| KR | 1020090104068 | 10/2009 |
| WO | 2008067543 | 6/2008 |
| WO | 2010015995 | 2/2010 |
| WO | 2010065235 | 6/2010 |
| WO | 2010138891 | 12/2010 |

OTHER PUBLICATIONS

BooksOnBoard Adds Google Checkout, Offers Discount on Google Checkout Purchases, WebWire, Google News, Jun. 11, 2008, pp. 1-2.

Broadcast, Dictionary.com, <<http://dictionary.reference.com/browse/broadcast>>, Feb. 6, 2012, 4 pages.

MGM Grand, MacroView Labs—Mobile App Developers for iPhone, Android, Blackberries, «http://www.macroviewlabs.com/mgmgrand», Jan. 13, 2011, 5 pages.

Piacecast Raises $3 Million for Location-Based Mobile Marketing Technology, The Good NET Guide, http://lthegoodnetguide.com/03/placecast-raises-3-million-for-location-based-mobile-marketing-technology, Mar. 25, 2010, 1 page.

Purchase, Definition, «dictionary.reference.com/browse/purchases=t», World English Dictionary, 2009, 2 pages.

Alqerem et al., Location Dependent Transaction for Mobile Environment, International Conference on Information and Communi-

(56) References Cited

OTHER PUBLICATIONS cation Technologies: From Theory to Applications, Piscataway, NJ, 2006, 2 pages.
Collins, Smartphones to be used as Hotel Room Keys, Telegraph Media Group Limited, http://www.telegraph.co.uk/travel/hotels/7762522/Smartphones-to-be-used-as-hotel-room-keys.html, May 25, 2010, pp. 1-2.
Deleon, Holiday Inn to Trial Mobile-as-room-key Program Next Month, TechCrunch, http://www.mobilecrunch.com/201 0/05/25/holiday-inn-to-trial-mobile-as-room-key-program-next-month/, May 25, 2010, 1 page.
Prabhu, Transaction Processing in Mobile Database System, University of Missouri—Kansas City, 2006. vol. 67/12-B of Dissertation Abstracts International, 2006, 1 page.
Canadian Application No. 2,794,085, Office Action dated Aug. 29, 2014, 3 pages.
Canadian Application No. 2,794,085, Office Action dated Sep. 15, 2016, 3 pages.
Canadian Application No. 2,794,085, Office Action dated Aug. 27, 2015, 4 pages.
Canadian Application No. 2,830,268, Office Action dated Apr. 7, 2015, 5 pages.
Canadian Application No. 2,830,268, Office Action dated Mar. 30, 2016, 5 pages.
Chinese Application No. 201180015579.3, Notice of Decision to Grant dated Sep. 1, 2016, 2 pages (1 page of Original document and 1 pages of English Translation).
Chinese Application No. 201180015579.3, Office Action dated Mar. 10, 2015, 23 pages.
Chinese Application No. 201180015579.3, Office Action dated Oct. 16, 2015, 13 pages.
Chinese Application No. 201280008527.8, Office Action dated Aug. 4, 2016, 15 pages.
Chinese Application No. 201280008527.8, Office Action dated Dec. 24, 2015, 16 pages.
European Application No. 11759940.7, Extended European Search Report dated Feb. 26, 2014, 11 pages.
European Application No. 11759940.7, Office Action dated Aug. 17, 2016, 6 pages.
European Application No. 12760316.5, Extended European Search Report dated Oct. 31, 2014, 7 pages.
European Application No. 12760316.5, Office Action dated Aug. 9, 2016, 6 pages.
Japanese Application No. 2013-500205, Notice of Allowance dated Dec. 15, 2015, 6 pages (3 pages of Original document and 3 pages of English Translation).
Japanese Application No. 2013-500205, Office Action dated Dec. 10, 2013, 9 pages (4 pages of Original document and 5 pages of English Translation).
Japanese Application No. 2013-553675, Office Action dated Jul. 29, 2014, 9 pages (4 pages of Original document and 5 pages of English Translation).
Japanese Application No. 2014-094659, Office Action dated Jul. 1, 2014, 4 pages (2 pages of Original document and 2 pages of English Translation).
Japanese Application No. 2015-047434, Office Action dated Mar. 31, 2015, 9 pages.
Korean Application No. 10-2012-7024786, Office Action dated Oct. 17, 2014, 11 pages (6 pages of Original document and 5 pages of English Translation).
Korean Application No. 10-2012-7024786, Office Action dated Apr. 24, 2015, 9 pages.
Korean Application No. 10-2014-7035474, Office Action dated Jan. 28, 2015, 11 pages pages (6 pages of Original document and 5 pages of English Translation).
Korean Application No. 10-2014-7035474, Office Action dated Oct. 29, 2015, 5 pages (3 pages of Original document and 2 pages of English Translation).
Korean Application No. 10-2015-07033998, Office Action dated Jul. 26, 2016, 7 pages (4 pages of Original document and 3 pages of English Translation).
Korean Application No. 10-2015-7033998, Office Action dated Jan. 6, 2016, 10 pages (6 pages of Original document and 4 pages of English Translation).
International Application No. PCT/US2011/028825, International Search Report and Written Opinion dated May 12, 2011, 8 pages.
International Application No. PCT/US2012/029798, International Search Report and Written Opinion dated Jul. 5, 2012, 7 pages.
U.S. Appl. No. 12/820,672, Non-Final Office Action dated Mar. 24, 2011, 24 pages.
U.S. Appl. No. 12/820,672, Notice of Allowance dated Nov. 7, 2011, 10 pages.
U.S. Appl. No. 12/820,672, Restriction Requirement dated Jan. 27, 2011, 9 pages.
U.S. Appl. No. 12/820,705, Advisory Action dated Sep. 27, 2016, 3 pages.
U.S. Appl. No. 12/820,705, Restriction Requirement dated Feb. 11, 2015, 7 pages.
U.S. Appl. No. 12/820,705, Restriction Requirement dated Nov. 22, 2011, 8 pages.
U.S. Appl. No. 12/820,705, Final Office Action dated Sep. 2, 2014, 13 pages.
U.S. Appl. No. 12/820,705, Final Office Action dated Dec. 5, 2013, 15 pages.
U.S. Appl. No. 12/820,705, Final Office Action dated Jun. 17, 2016, 15 pages.
U.S. Appl. No. 12/820,705, Final Office Action dated Aug. 19, 2015, 15 pages.
U.S. Appl. No. 12/820,705, Final Office Action dated Jul. 25, 2012, 17 pages.
U.S. Appl. No. 12/820,705, Non-Final Office Action dated Apr. 2, 2014, 12 pages.
U.S. Appl. No. 12/820,705, Non-Final Office Action dated Feb. 9, 2016, 13 pages.
U.S. Appl. No. 12/820,705, Non-Final Office Action dated Dec. 2013, 16 pages.
U.S. Appl. No. 12/820,705, Non-Final Office Action dated Feb. 27, 2012, 17 pages.
U.S. Appl. No. 12/820,705, Non-Final Office Action dated Apr. 17, 2015, 24 pages.
U.S. Appl. No. 12/820,743, Final Office Action dated Apr. 10, 2014, 24 pages.
U.S. Appl. No. 12/820,743, Final Office Action dated Jun. 21, 2012, 24 pages.
U.S. Appl. No. 12/820,743, Non-Final Office Action dated Feb. 27, 2012, 18 pages.
U.S. Appl. No. 12/820,743, Advisory Action dated Oct. 7, 2015, 3 pages.
U.S. Appl. No. 12/820,743, Non-Final Office Action dated Feb. 1, 2016, 9 pages.
U.S. Appl. No. 12/820,743, Restriction Requirement dated Jan. 7, 2015.
U.S. Appl. No. 12/820,743, Restriction Requirement dated Nov. 18, 2011.
U.S. Appl. No. 12/820,743, Final Office Action dated Jun. 29, 2016, 14 pages.
U.S. Appl. No. 12/820,743, Office Action dated Apr. 3, 2015, 21 pages.
U.S. Appl. No. 12/820,743, Office Action dated Dec. 27, 2013, 26 pages.
U.S. Appl. No. 12/820,816, Non-Final Office Action dated Dec. 31, 2012, 11 pages.
U.S. Appl. No. 12/820,816, filed Jun. 22, 2010.
U.S. Appl. No. 12/820,854, Final Office Action dated Aug. 31, 2016, 21 pages.
U.S. Appl. No. 12/820,854, Final Office Action dated Oct. 22, 2013, 22 pages.
U.S. Appl. No. 12/820,854, Non-Final Office Action dated Jul. 27, 2012, 18 pages.
U.S. Appl. No. 12/820,854, Final Office Action dated Jun. 3, 2015, 11 pages.

(56) References Cited

OTHER PUBLICATIONS

U.S. Appl. No. 12/820,854, Non-Final Office Action dated May 24, 2016, 19 pages.
U.S. Appl. No. 12/820,854, Non-Final Office Action dated Apr. 10, 2013, 22 pages.
U.S. Appl. No. 12/820,854, Non-Final Office Action dated Nov. 5, 2014, 23 pages.
U.S. Appl. No. 12/820,854, Non-Final Office Action dated May 9, 2014, 26 pages.
U.S. Appl. No. 12/820,913, Final Office Action dated Apr. 24, 2015, 12 pages.
U.S. Appl. No. 12/820,913, Final Office Action dated Apr. 9, 2014, 21 pages.
U.S. Appl. No. 12/820,913, Final Office Action dated Mar. 4, 2016, 42 pages.
U.S. Appl. No. 12/820,913, Non-Final Office Action dated Jul. 31, 2012, 14 pages.
U.S. Appl. No. 12/820,913, Non-Final Office Action dated Jul. 22, 2016, 19 pages.
U.S. Appl. No. 12/820,913, Non-Final Office Action dated Sep. 9, 2015, 30 pages.
U.S. Appl. No. 12/820,913, Office Action dated Sep. 11, 2014, 15 pages.
U.S. Appl. No. 12/820,913, Advisory Action dated May 8, 2013, 3 pages.
U.S. Appl. No. 12/820,913, Office Action dated Feb. 8, 2013, 19 pages.
U.S. Appl. No. 12/820,913, Office Action dated Dec. 4, 2013, 24 pages.
U.S. Appl. No. 12/820,949, Final Office Action dated Jan. 6, 2014, 22 pages.
U.S. Appl. No. 12/820,949, Advisory Action dated Apr. 16, 2014, 3 pages.
U.S. Appl. No. 12/820,949, filed Jun. 22, 2010.
U.S. Appl. No. 12/820,949, Restriction Requirement dated Jul. 31, 2012.
U.S. Appl. No. 12/820,949, Office Action dated Nov. 9, 2012, 11 pages.
U.S. Appl. No. 12/820,949, Office Action dated Jun. 20, 2013, 20 pages.
U.S. Appl. No. 12/894,287, Final Office Action dated Jul. 16, 2013, 18 pages.
U.S. Appl. No. 12/894,287, Final Office Action dated Apr. 9, 2015, 25 pages.
U.S. Appl. No. 12/894,287, Final Office Action dated Feb. 22, 2016, 29 pages.
U.S. Appl. No. 12/894,287, Advisory Action dated Dec. 19, 2013, 3 pages.
U.S. Appl. No. 12/894,287, Non-Final Office Action dated Mar. 27, 2014, 18 pages.
U.S. Appl. No. 12/894,287, Restriction Requirement dated Sep. 25, 2012, 7 pages.
U.S. Appl. No. 12/894,287, Non-Final Office Action dated Sep. 3, 2015, 24 pages.
U.S. Appl. No. 12/894,287, Non-Final Office Action dated Dec. 4, 2014, 25 pages.
U.S. Appl. No. 12/894,287, Non-Final Office Action dated Jul. 29, 2016, 38 pages.
U.S. Appl. No. 12/894,287, Non-Final Office Action dated Dec. 5, 2012, 9 pages.
U.S. Appl. No. 12/894,323, Final Office Action dated Jun. 24, 2013, 12 pages.
U.S. Appl. No. 12/894,323, Non-Final Office Action dated Sep. 11, 2014, 15 pages.
U.S. Appl. No. 12/894,323, Notice of Allowance dated Feb. 2, 2015, 14 pages.
U.S. Appl. No. 12/894,323, Restriction Requirement dated Sep. 25, 2012, 7 pages.
U.S. Appl. No. 12/894,323, Non-Final Office Action dated Dec. 12, 2012, 9 pages.
U.S. Appl. No. 12/976,533, Final Office Action dated Jun. 3, 2016, 51 pages.
U.S. Appl. No. 12/976,533, Non-Final Office Action dated Aug. 16, 2012, 38 pages.
U.S. Appl. No. 12/976,533, Non-Final Office Action dated Sep. 23, 2015, 39 pages.
U.S. Appl. No. 12/976,533, Office Action dated Apr. 12, 2013, 44 pages.
U.S. Appl. No. 12/976,533, filed Dec. 22, 2010.
U.S. Appl. No. 13/027,913, filed Feb. 15, 2011.
U.S. Appl. No. 13/027,913, Non-Final Office Action dated Mar. 29, 2011, 25 pages.
U.S. Appl. No. 13/027,913, Notice of Allowance dated Nov. 7, 2011, 21 pages.
U.S. Appl. No. 13/052,930, Final Office Action dated Jul. 8, 2013, 20 pages.
U.S. Appl. No. 13/052,930, Final Office Action dated Jul. 1, 2014, 30 pages.
U.S. Appl. No. 13/052,930, Non-Final Office Action dated Jul. 10, 2015, 30 pages.
U.S. Appl. No. 13/052,930, Final Office Action dated Feb. 2, 2016, 35 pages.
U.S. Appl. No. 13/052,930, Non-Final Office Action dated Jan. 2, 2013, 20 pages.
U.S. Appl. No. 13/052,930, Non-Final Office Action dated Dec. 16, 2013, 28 pages.
U.S. Appl. No. 13/052,930, filed Mar. 21, 2011.
U.S. Appl. No. 13/111,920, Final Office Action dated Feb. 12, 2016, 34 pages.
U.S. Appl. No. 13/111,920, Non-Final Office Action dated Sep. 14, 2016, 34 pages.
U.S. Appl. No. 13/111,920, Office Action dated Oct. 2, 2013, 28 pages.
U.S. Appl. No. 13/111,920, Office Action dated Jun. 20, 2014, 31 pages.
U.S. Appl. No. 13/111,920, Non-Final Office Action dated Jul. 10, 2015, 30 pages.
U.S. Appl. No. 13/371,038, Non-Final Office Action dated Jul. 23, 2012, 9 pages.
U.S. Appl. No. 13/371,038, Notice of Allowance dated Oct. 11, 2012, 9 pages.
U.S. Appl. No. 13/371,038, Restriction Requirement dated Apr. 6, 2012, 7 pages.
U.S. Appl. No. 13/371,038, filed Feb. 10, 2012.
U.S. Appl. No. 13/468,714, Final Office Action dated Feb. 25, 2016, 12 pages.
U.S. Appl. No. 13/468,714, Non-Final Office Action dated Aug. 16, 2012, 29 pages.
U.S. Appl. No. 13/468,714, Non-Final Office Action dated Apr. 11, 2013, 35 pages.
U.S. Appl. No. 13/468,714, Non-Final Office Action dated Aug. 31, 2015, 36 pages.
U.S. Appl. No. 13/468,714, Notice of Allowance dated Feb. 28, 2017, 9 pages.
U.S. Appl. No. 13/725,466, Final Office Action dated Mar. 16, 2016, 28 pages.
U.S. Appl. No. 13/725,466, Non-Final Office Action dated Oct. 5, 2015, 20 pages.
U.S. Appl. No. 13/973,870, Corrected Notice of Allowability dated May 20, 2015, 7 pages.
U.S. Appl. No. 13/973,870, Notice of Allowance dated Apr. 3, 2015, 11 pages.
U.S. Appl. No. 14/726,380, Final Office Action dated Apr. 15, 2016, 36 pages.
U.S. Appl. No. 14/726,380, Office Action dated Jul. 22, 2015, 12 pages.
U.S. Appl. No. 14/726,380, Restriction Requirement dated Dec. 9, 2015, 7 pages.
U.S. Appl. No. 14/726,380, Non-Final Office Action dated Aug. 9, 2016, 43 pages.
U.S. Appl. No. 14/821,337, Corrected Notice of Allowability dated May 2, 2016, 5 pages.

(56) References Cited

OTHER PUBLICATIONS

U.S. Appl. No. 14/821,337, Notice of Allowance dated Mar. 11, 2016, 9 pages.
U.S. Appl. No. 61/142,100, filed Dec. 31, 2008.

* cited by examiner

MOBILE PAYMENTS USING POINT-OF-SALE INFRASTRUCTURE

CROSS REFERENCE TO RELATED APPLICATIONS

This application is a Continuation of U.S. application Ser. No. 13/468,714, filed May 10, 2012, entitled "MOBILE PAYMENTS USING POINT-OF-SALE INFRASTRUCTURE", which is a continuation of U.S. patent application Ser. No. 12/976,533 entitled "Mobile Payments Using Point-of-sale Infrastructure" filed on Dec. 22, 2010 which claims the benefit of U.S. Provisional Application Nos. 61/316,527 filed on Mar. 23, 2010 and 61/351,743 filed on Jun. 4, 2010 all of which are incorporated by reference herein in their entirety.

BACKGROUND

Presently there is no simple way to use a mobile device to pay for a transaction. Use of specialized hardware to scan a barcode displayed on the mobile device or identify a specific code for a mobile device with a wireless signal such as Near Fields Communications (NFC) generally require a merchant to modify existing equipment. Merchants may be reluctant to adopt mobile-device payments if doing so requires additional expense. However, as smart phones and other mobile devices are becoming more ubiquitous consumer expectations for these devices are increasing and consumers may expect to use the mobile device itself for payment rather than a check or credit card. Although most merchants have point-of-sale (POS) devices for processing credit card, check, and cash transactions, a secure way of using a mobile device to pay for such transactions, without expensive modifications to existing POS devices, does not yet exist. Providing such an option would increase convenience for consumers without burdening merchants.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
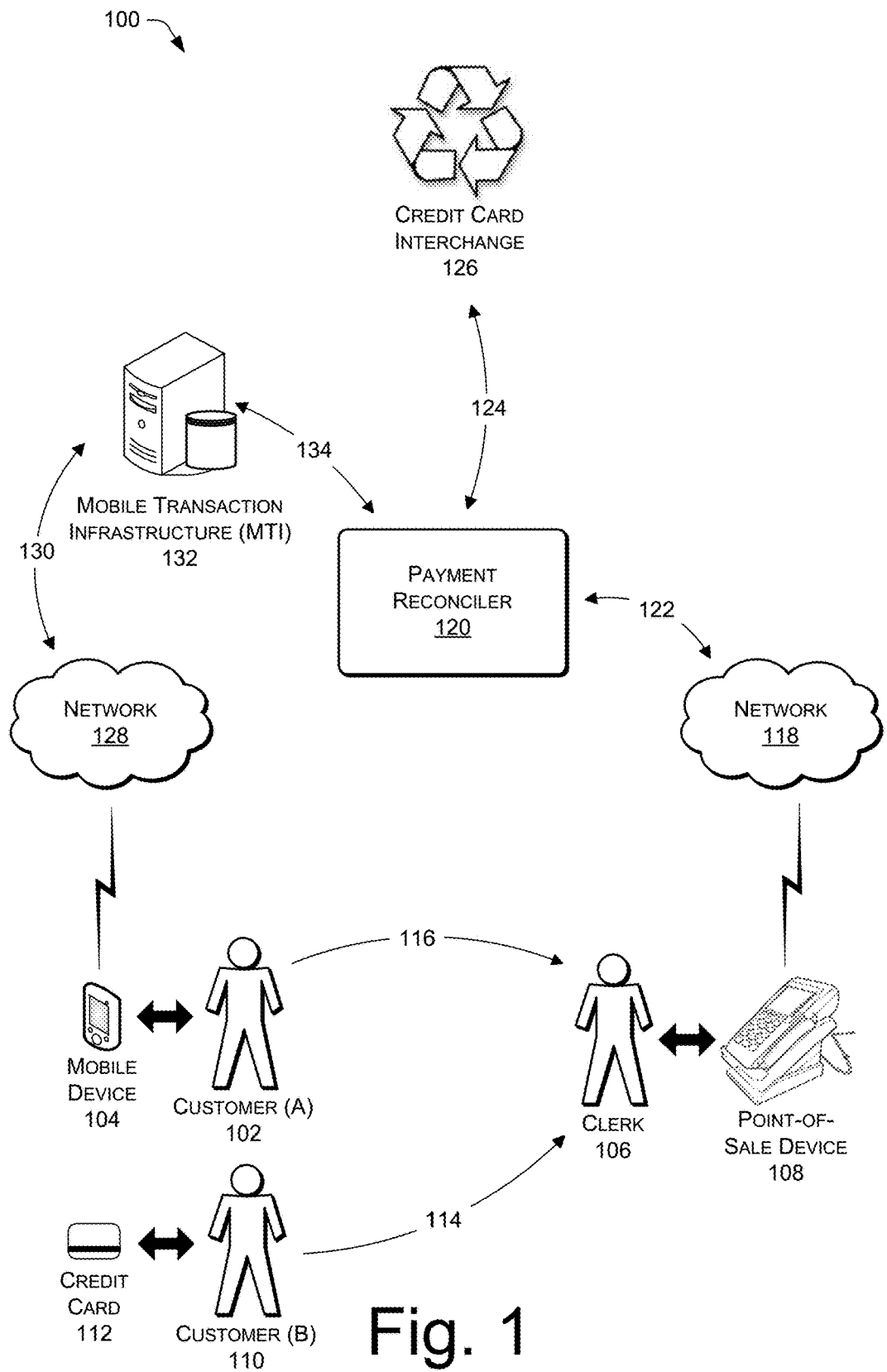
FIG. 1 shows an illustrative architecture for using existing backend credit card processing systems for accepting payments from mobile devices.

A point-of-sale (POS) device (e.g., an electronic cash register and/or a card reader) at a merchant location may be readily modified to accept additional types of credit cards. For example, a POS device configured to process Visa® and MasterCard® transactions may be modified to also accept American Express® and Discover® Card transaction. The modification is generally a software configuration change that is relatively easy to implement and does not require additional hardware. This disclosure explains how POS devices may be similarly modified to accept payments from mobile devices referred to herein as mobile payment accounts (MPA).

When paying for a transaction with a credit card, the magnetic strip on the card provides information to the POS device that is then sent to the credit card interchange for authorization. The need to have a tangible object, the credit card, to slide through a card reader provides a greater level of security than a transaction conducted merely by a customer providing an intangible card number. Cardholders can protect and secure the credit card itself easier than guarding a number.

Mobile devices such as smart phones, personal digital assistants, etc. typically do not have magnetic strips like those found on credit cards. A customer could provide a code number associated with the mobile device. This code number may function like a credit card or checking account number, but this type of transaction would suffer from the same security shortcomings as providing an intangible credit card number without the credit card. Thus, it is necessary to identify a way to link the mobile device to a transaction. This is accomplished by taking advantage of the ability of a mobile device to connect to a network (e.g., the Internet) and to detect its own location such as through the use of global positioning satellite (GPS) technology.

The mobile device provides its current location, possibly along with a timestamp and other information, to a mobile transaction infrastructure that communicates with a gateway provider and/or a payment processor (e.g., a bank that issues credit cards, an American Express® payment processor, etc.) in the credit card interchange. The mobile transaction infrastructure also receives information from the POS device similar to the information provided for a conventional credit card transaction. This information may include the amount of a charge to be applied against the MPA as well as a time of the transaction and the location or other identifying information about the POS device. Information provided by the mobile device is compared with information provided by the POS device in order to identify a match, and thus, appropriately charge a bank account (or other account) associated with the mobile device. By combining information from the mobile device and information from the POS device, the techniques described herein provide for secure transactions and link transaction authorization to a tangible object (e.g., the mobile device) while using the existing backend infrastructure for processing credit card transactions.

The described techniques using a mobile device and associated mobile payment account (MPA) to pay for a transaction made at a POS device may be implemented in a number of ways and in a number of contexts. Example implementations and context are provided with reference to the following figures, as described below in more detail. It is to be appreciated, however, that the following implementations and contexts illustrative of many possible implementations and contexts.

Illustrative Architecture

FIG. 1 shows an illustrative architecture 100 in which a customer (A) 102 employs a mobile device 104 to interact with a clerk 106 operating a POS device 108. The clerk 106 and the POS device 108 may also receive payments from customer (B) 110 using a credit card 112. Although this example shows the clerk 106, the clerk 106 may be absent in implementations in which customers 102 and 110 interact directly with the POS device 108 such as in a self-checkout system.

Customer (B) 110 provides the credit card 112 to the clerk 106 for processing at the POS device 108. This transfer of information is represented here as path 114. Similarly, customer (A) 102 provides an indication, along path 116, to the clerk 106 that he or she wishes to pay for the transaction with a mobile payment account (MPA). Similar to how a customer may say "I wish to pay with Visa," customer (A) 102 may inform the clerk 106 that he or she wishes to pay with "MPA." Of course MPA is merely an illustrative name and any designation may be assigned to this type of payment. The communication between customer (A) 102 and the clerk 106 along path 116 may also include other information such as a passphrase, a user identifier, a password, a code number, or the like. For example, customer (A) 102 could tell the clerk 106 that "I wish to pay with MPA and my passphrase is feisty mango." The clerk 106 may enter this information into the POS device 108. At this point customer (A) 102, unlike customer (B) 110, has not yet provided any tangible object such as a credit card in conjunction with the transaction.

The POS device 108 provides information received about credit card transactions or mobile device transactions to a network 118. The network 118 may be a public network such as the Internet or a private or limited-access network for processing credit card and other financial transactions. Information from the POS device 108 is provided via the network 118 to a payment reconciler 120 along path 122. The payment reconciler 120 may represent a gateway provider such as one that can be found in a conventional credit card processing system. The payment reconciler 120 may also represent a payment processor for processing credit card payments. Some systems for processing credit card payments send information from the POS device 108 through a gateway provider before sending the information to a payment processor while other systems do not use gateway providers. In either type of system, there is a point at which transaction information from the POS device 108 is reconciled with data from credit card accounts. That is represented here as the payment reconciler 120 which includes payment processing systems both with and without gateway providers.

The transaction information from either customer (A) 102 using the mobile device 104 or customer (B) 110 using the credit card 112 may be processed similarly up to this point. The payment reconciler 120 may process transactions differently based on the method of payment. For MPA transactions, the payment reconciler 120 may combine the information received from the POS device 108 with other information as will be discussed below. For credit card transactions, the payment reconciler 120 may route those transactions over path 124 to the credit card interchange 126 for further processing as is conventionally performed when a transaction is paid for with a credit card.

While information from the POS device 108 is being delivered to the payment reconciler 120, the mobile device 104 also provides information to the payment reconciler 120 through the mobile transaction infrastructure (MTI) 132.

The mobile device 104 may be implemented as any number of mobile devices, including but not limited to a mobile phone, a personal digital assistant (PDA), a laptop computer, a net book, an eBook reader, a personal media player (PMP), a portable gaming system, and so forth. The mobile device 104 is location aware, or is able to provide information to another entity (e.g., a server) to allow the other entity to determine a location of the device 104. A location on the surface of the earth, or a "geolocation," may be provided to the mobile device 104 by a satellite such as a global positioning system (GPS) satellite. Alternatively, wireless signals such as from a radio antenna may be used to determine a geolocation of the mobile device 104 relative to a known position of the radio antenna or by triangulation. Other technologies and methods for determining geolocation are also envisioned within the scope of this disclosure such as, for example, calculating geolocation based on a network access point (e.g., Wi-Fi hotspot) or from a locator signal broadcast from a known location such as inside a merchant.

The mobile device 104 is also capable of connecting to a network 128. The connection may be wireless using radio signals (e.g., Wi-Fi, Bluetooth®, 3G network, 4G network, etc.). The network 128 may include any one or combination of multiple different types of networks, such as cable networks, local area networks, personal area networks, wide area networks, the Internet, wireless networks, ad hoc networks, mesh networks, and/or the like. The network 128 may be the same or different than the network 118.

Information from the mobile device 104 travels through the network 128 along path 130 to the MTI 132. Connecting to network 128 may include connecting to a website maintained by the merchant. Accessing the merchant's website may allow the mobile-device transaction to be processed in part like an on-line purchase with at least some of the transaction information provided by the POS device 108. In such implementations, the merchant's website may pass the mobile device information to the MTI 132.

The MTI 132 may contain user data about customer (A) 102 who is the user of mobile device 104. This user data may include identification of the user's account, such as a bank account, or credit card information associated with the account for use in payments made by the mobile device 104. The user data may also include a passphrase, user identifier, or similar code that can be used to uniquely identify both the user (i.e., customer (A)) and the mobile device 104. When this identifying passphrase is provided by the POS device 108 to the payment reconciler 120 the transaction matching module 208 may use that passphrase to identify the transaction as associated with the mobile device 104. A photograph of customer (A) 102 may also be part of the user data and this photograph may be provided to the POS device 108 for the clerk 106 to verify the identity of the person paying with a MPA.

The information sent from the mobile device 104 may at a minimum include a location of the mobile device 104. For example, if customer (A) 102 is inside a store (e.g., "Merchant 1"), the location of the mobile device 104 as being inside Merchant 1 may be provided to the MTI 132, or inferred by the MTI based on the geo coordinates provided by the mobile device using a reference database of merchant locations. The mobile device 104 may also provide additional information to the MTI 132. This additional information may include time such as a time stamp combined with the location information. Moreover, the additional information may include other data entered by the customer (A) 102 into the mobile device 104. The other data may help confirm or identify a transaction and could include information such as the amount of charge for the transaction, a number associated with the POS device 108, and/or information about a product purchased such as the product number or barcode number.

Once the payment reconciler 120 has received information along path 122 from the POS device 108 and information along path 134 from the MTI 132, the payment reconciler 120 may compare the two sets of information to determine if there is a "match." Recall that in some implementations, customer (A) 102 may simply provide instructions to the clerk 106 but does not necessarily provide a user identifier or even show the mobile device 104 to the clerk 106. In order to avoid fraudulent or mistaken charges, it is beneficial to establish that the mobile device 104 of the person who is making the purchase (e.g., customer (A) 102) is actually in the same location as the POS device 108 that is processing the transaction.

The details of the specific techniques for identifying a match between information from the mobile device 104 and information from the POS device 108 is discussed in greater detail below. However, once the payment reconciler 120 determines that a match exists, it may contact the credit card interchange 126 to fund the transaction. It may do this by completing the merchant's transaction information by adding the credit card information, received from the MTI 132, and required in a standard credit card interchange transaction.

The customer (A) 102 may be asked to explicitly authorize the transaction. When querying customer (A) 102 via the mobile device 104, the MTI 132 communicates along path 130 to request authorization. If customer (A) 102 authorizes the transaction by, for example, pressing a button on the mobile device 104, the authorization is returned along path 130 to the MTI 132. The payment reconciler 120 may receive this authorization via path 134 and provide authorization to the POS device 108 along path 122. From the perspective of the POS device 106 (or the clerk 106 operating the device) an authorization for a MPA transaction may be indistinguishable from an authorization for a conventional credit card transaction.

Once authorization to complete the transaction is received from the mobile device 104 or alternatively authorized by the payment reconciler 120, the payment reconciler 120 signals the credit card interchange 126 to fulfill the payment. Customer (A) 102 may select which account he or she associates with MPA payments. For example, the money used to fund MPA transactions may ultimately come from the customer's savings account at a bank, from a credit card account, from a PayPal™ account, or another type of account. Customer (A) 102 may set a default account (e.g., credit card) and this default account may be automatically used without querying the customer (A) 102 during each transaction.

Similar to credit card transactions, part of the money withdrawn from the customer's account may be directed to entities other than the merchant such as the MTI 132, the payment reconciler 120, and/or other entities to pay for interchange or other fees.

In summary, addition of the MTI 132, modification to the payment reconciler 120, and minor, generally software configuration, modifications to the POS device 108 allow a merchant to accept MPA payments similar to how the merchant would accept credit card payments. The location awareness and network connection of the mobile device 104 provides a tangible "anchor" to the transaction that allows MPA transactions to be at least as secure as conventional credit card transactions.

Illustrative Payment Reconciler

Figure 2:
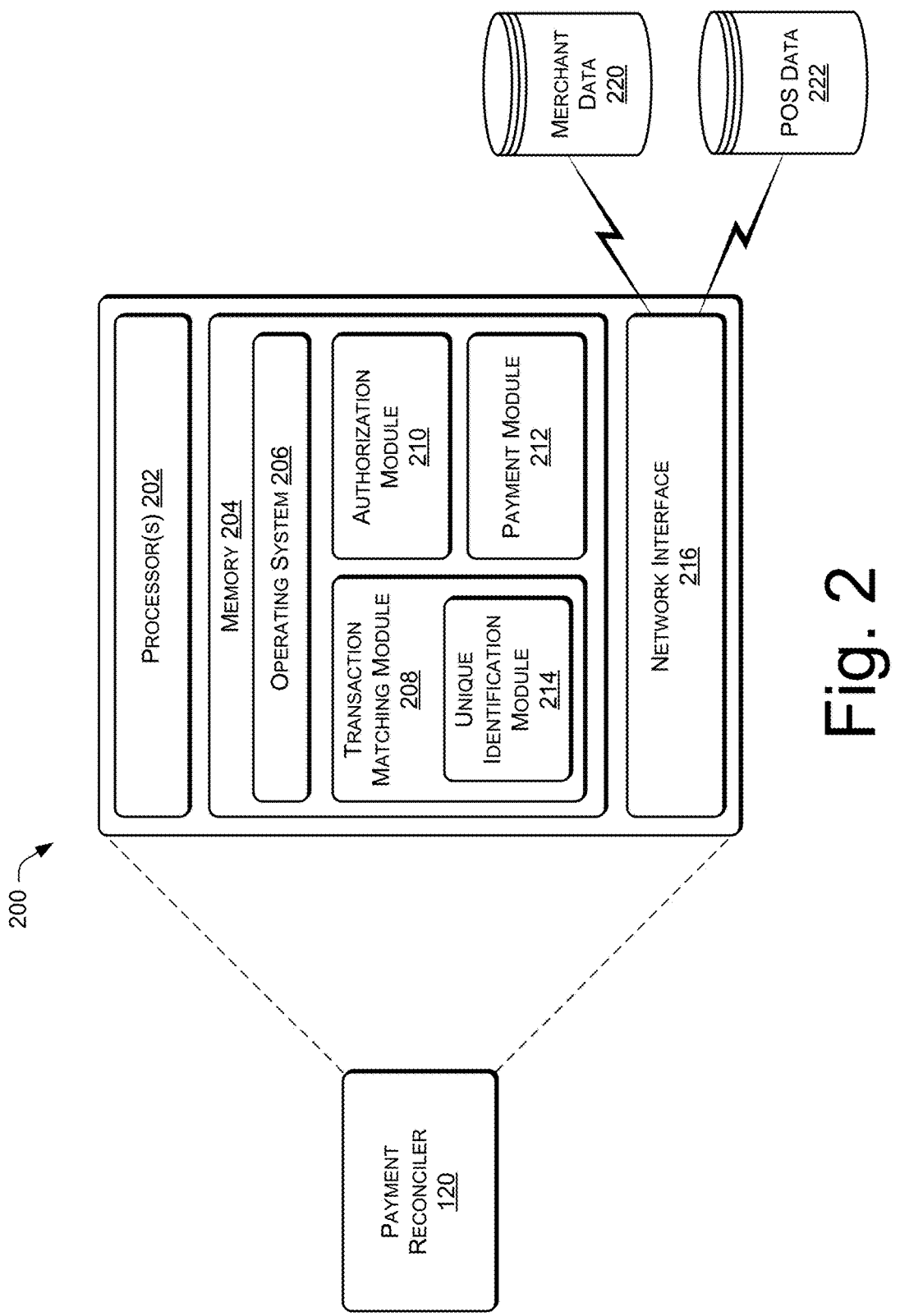
FIG. 2 shows the mobile transaction infrastructure from FIG. 1 in greater detail.

FIG. 2 is a schematic representation of the payment reconciler 120 of FIG. 1. Recall that the payment reconciler 120 may be a gateway provider or a payment processor in some implementations. The payment reconciler 120 comprises one or more processors 202 and a memory 204. The memory 204 may contain an operating system 206 for controlling the MTI 132 and managing software and hardware. The memory 204 may contain software modules such as a transaction matching module 208, an authorization module 210, and a payment module 212.

The transaction matching module 208 evaluates information received from the POS device 108 and MTI 132 to identify a matching transaction. The match may be based on any number of factors such as location, time, the amount of a transaction charge, an identifier for the POS device 108, an identifier for the purchased good/service, or other factors. Identification of a match serves as a validation that the transaction initiated at the POS device 108 is in fact associated with a physical object specifically the mobile device 104.

The transaction module 208 may include a unique identification module 214. The unique identification module 214 evaluates information received from the POS device 108 and the MTI 132 to determine if sufficient information exists to uniquely identify one of the multiple transactions from the POS device 108 as being the transaction associated with the mobile device 104. For example, a single POS device (or multiple POS devices at the same merchant) may process more than one MPA transaction at approximately the same time. In this situation, time alone would be insufficient to uniquely identify which of the MPA transactions should be associated with the mobile device 104. The unique identification module 214 can recognize whether or the information available to the transaction matching module 208 is sufficient to uniquely identify one of the transactions as properly being associated with the mobile device 104. If it is not possible to uniquely identify one of the transactions, the unique identification module 214 may instruct the MTI 132 to request additional information from the mobile device 104.

The authorization module 210 determines whether or not a transaction is authorized. As discussed above, the payment reconciler 120 may determine if a transaction should be authorized by, for example, identifying a unique match between a transaction and a mobile device 104 or by receiving a message from the mobile device 104 to authorize the transaction. The authorization module 210 may evaluate the match determined by the transaction matching module 208 and possibly serve as a second check to make sure that the matched transaction is appropriate to authorize.

When messages are received from either the mobile device 104 or the POS device 108, the authorization module 210 may evaluate the format, encoding, and other characteristics of the messages to determine whether they are authentic. The authorization module 210 may also serve as a check to prevent the authorization process from proceeding further until the required authorization message(s) have been received. When a transaction is authorized, authorization module 210 informs the POS device 108 that the transaction is authorized so the clerk 106 has confirmation that it is acceptable to provide the good/service to the customer.

The payment module 212 provides instructions to the credit card interchange 126 to fund the transaction. The payment module 212 may also communicate with the credit card interchange 126 to determine if sufficient funds or sufficient credit is available to pay for the transaction. This information may be passed to the authorization module 210 so that the authorization module 210 can decline the transaction if the customer's available funds or credit limit associated with the mobile device 104 is insufficient, or approve it if the funds are sufficient. Once funds have been withdrawn, or instructions to do so have been sent, the payment module 212 may instruct the MTI 132 to notify the mobile device 104.

The payment reconciler 120 also includes a network interface 216 for communicating with other entities shown in the architecture 100 of FIG. 1 such as the MTI 132, the credit card interchange 126, network 118, etc.

The payment reconciler 120 may include or have access to multiple data stores such as a data store for merchant data 220, and/or a data store for POS data 222. In some implementations, the merchant data 220 and the POS data 222 are included in the MTI 132 shown in FIG. 1. The merchant data 220 includes information about the merchants who accept MPA payments. This information may include geographic locations ("geolocations") of the merchants. Correlation between the geolocation of a particular merchant stored in the merchant data 220 and the location of the mobile device 104 received by the MTI 132 may be used to infer that a mobile device 104 is located at the merchant. The concept of being "at" a merchant may be based on approximate location so that all mobile devices within a predetermined distance of the stored merchant location are interpreted to be at the merchant. For example, if latitude and longitude coordinates are stored in the merchant data 220 then every mobile device within some threshold distance (e.g. 10 m) of those coordinates may be considered to be at the merchant.

The POS data 222 contains information received from one or more POS devices such as the POS device 108 shown in FIG. 1. This information may be a list of all MPA transactions received by the POS device 108. For example, each time a customer indicates that he or she wishes to use MPA to pay for a transaction the information corresponding to that transaction may be sent from the POS device 108 to the payment reconciler 120. Each of these transactions, the amount of the charge, the time of the transaction, and other information may be stored in the POS data 222 for example as a log file recording all MPA transactions at all POS devices in communication with the payment reconciler 120. This data store of POS data 222 may be one source of data that the transaction matching module 208 uses to determine if there is a match between a transaction and the mobile device 104.

The payment reconciler 120 may include additional modules, data stores, and hardware beyond that shown in FIG. 2. Each of the modules may be combined with each other and/or further split into separate modules. Similarly, the data contained in the data stores may be stored in a greater or lesser number of data stores.

Illustrative Point-of-Sale Device

Figure 3:
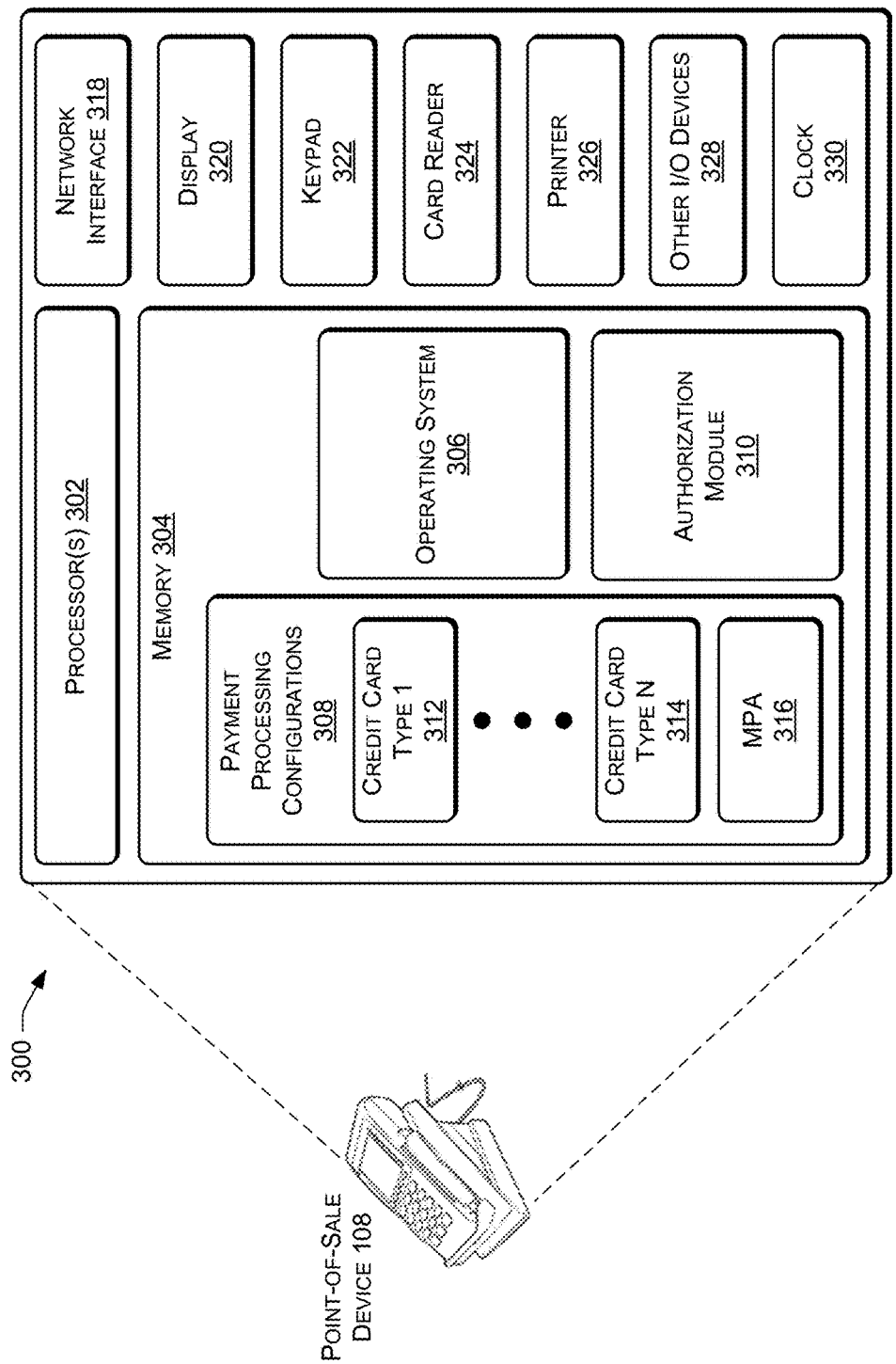
FIG. 3 shows the POS device from FIG. 1 in greater detail.

FIG. 3 is a schematic representation of the POS device 108 of FIG. 1. The POS device 108 may be implemented as an electronic cash register, a mobile card reader/payment system device, or another computing device. The POS device 108 comprises one or more processors 302 and a memory 304. The memory 204 may contain an operating system 306 for controlling the POS device. In some implementations, the memory 304 may be implemented in hardware or firmware. The memory 304 may contain one or more payment processing configurations 308 and software modules such as an authorization module 310.

The payment processing configurations 308 may include information for the POS device 108 to properly format and send information to various gateway providers and/or payment processors. This configuration information may include application programming interfaces (APIs), routing information, and security protocols. For example, the payment processing configurations 308 may include configuration information for processing 1-N types of credit cards. Credit card type (1) 312 may correspond to configuration information for Visa® cards and credit card type (N) may correspond to configuration information for Discover® Cards. The payment processing configurations 308 also includes configuration information for processing MPA 316 transactions. The MPA 316 configuration information directs data from an MPA transaction to the appropriate gateway provider or payment processor represented in FIG. 2 as the payment reconciler 120.

The POS device 108 also includes a network interface 318 for communicating with network 118. The network interface 318 may provide network connectivity through any wired or wireless technology such as a phone line, Ethernet cable, Bluetooth®, Wi-Fi, and the like.

The POS device 108 may also include various input and output devices such as a display 320 and keypad 322. Information may be read from credit cards by a card reader 324 and receipts or transaction records may be generated by a printer 326. The POS device 108 may also include other input/output devices 328 such as speakers, a touch-sensitive surface, a reader for EMV integrated circuit cards, etc.

The POS device 108 also includes a clock 330 implemented either as hardware or software and capable of tracking the time of each transaction.

Illustrative Mobile Device

Figure 4:
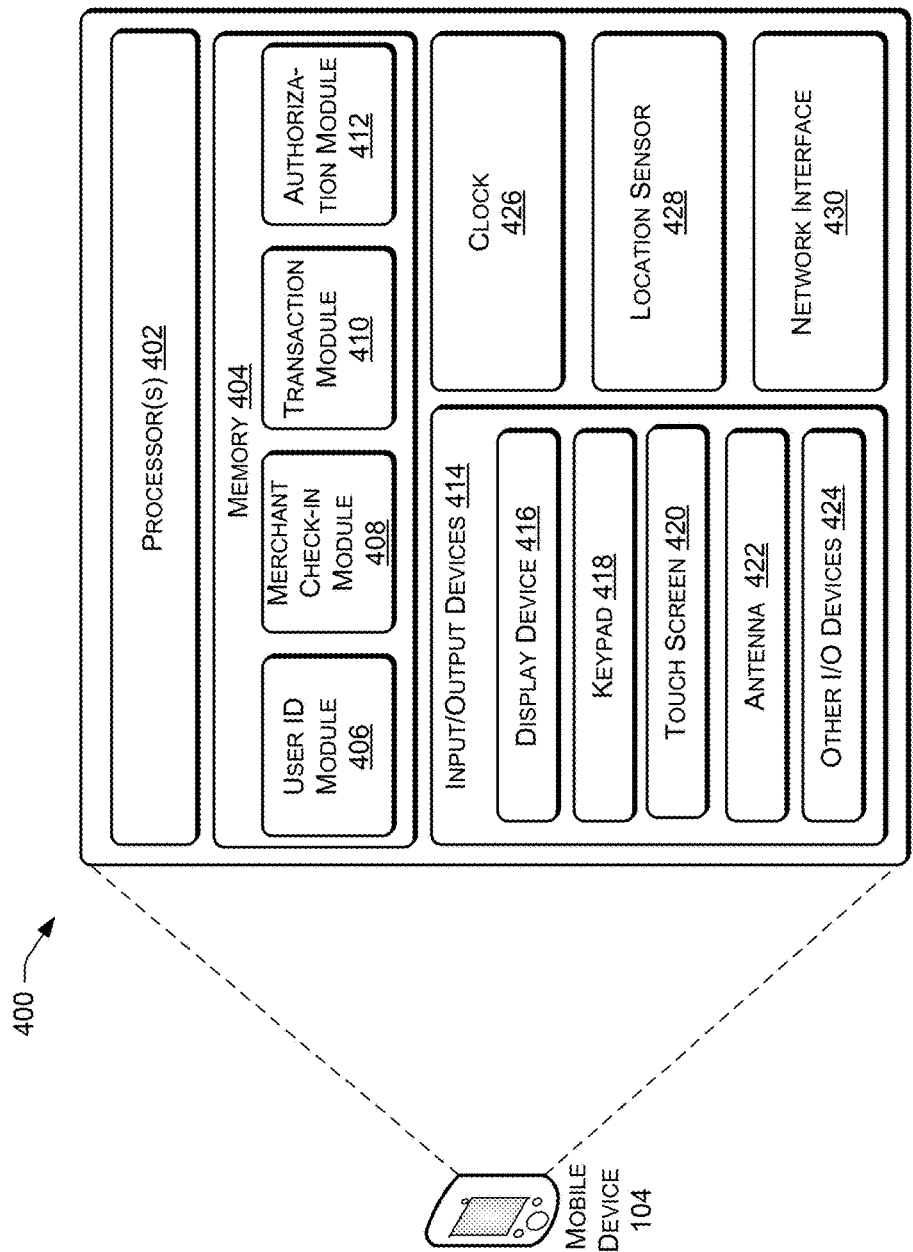
FIG. 4 shows the mobile device from FIG. 1 in greater detail.

FIG. 4 is a schematic representation of the mobile device 104 of FIG. 1. The mobile device 104 includes one or more processors 402 and a memory 404. The memory 404 may contain a user identification (ID) module 406. The user ID module 406 may receive indications (e.g., log-in credentials) that may provide the identity of the user to the mobile device 104. The indication provided by the user to the user ID module 406 may be provided from the mobile device 104 to the MTI 132 shown in FIG. 1.

Figure 5:
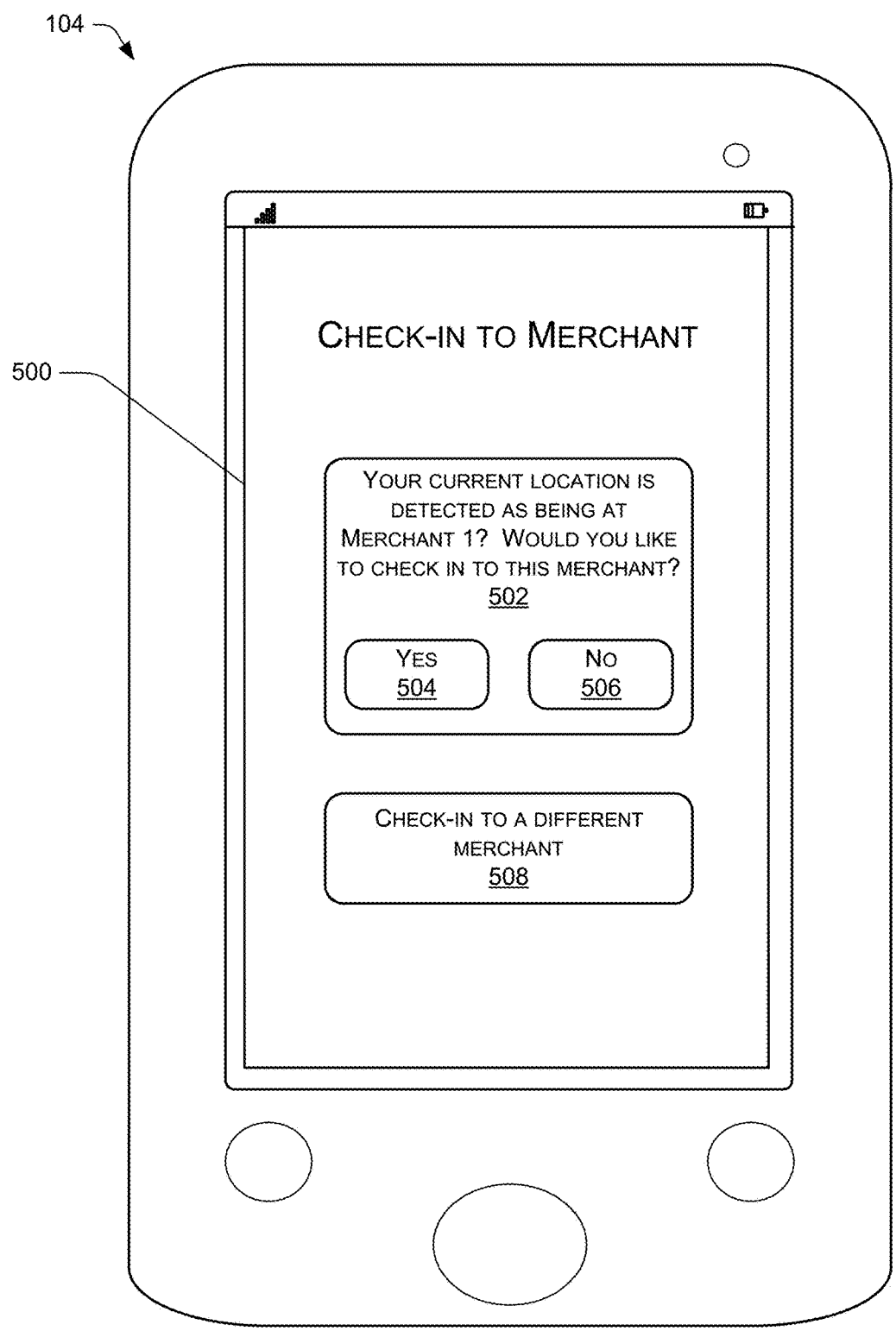
FIG. 5 shows an illustrative user interface for checking in to a merchant from a mobile device.

The memory 404 may also contain a merchant check-in module 408. The merchant check-in module 408 can register or "check-in" the mobile device 104 with a merchant when the mobile device 104 is located at that merchant. Check-in may be automatic. For example, the mobile device 104 may determine that it is located at the same geolocation as a merchant and inform another computer (e.g., a server computer of the merchant, the MTI 132, etc.) that it is at the merchant. Check-in may also be manual. Once at a merchant, or within a threshold distance of the merchant, the mobile device 104 may request user input before checking in to the merchant. FIG. 5 shows an illustrative user interface for checking in to a merchant.

Figure 6:
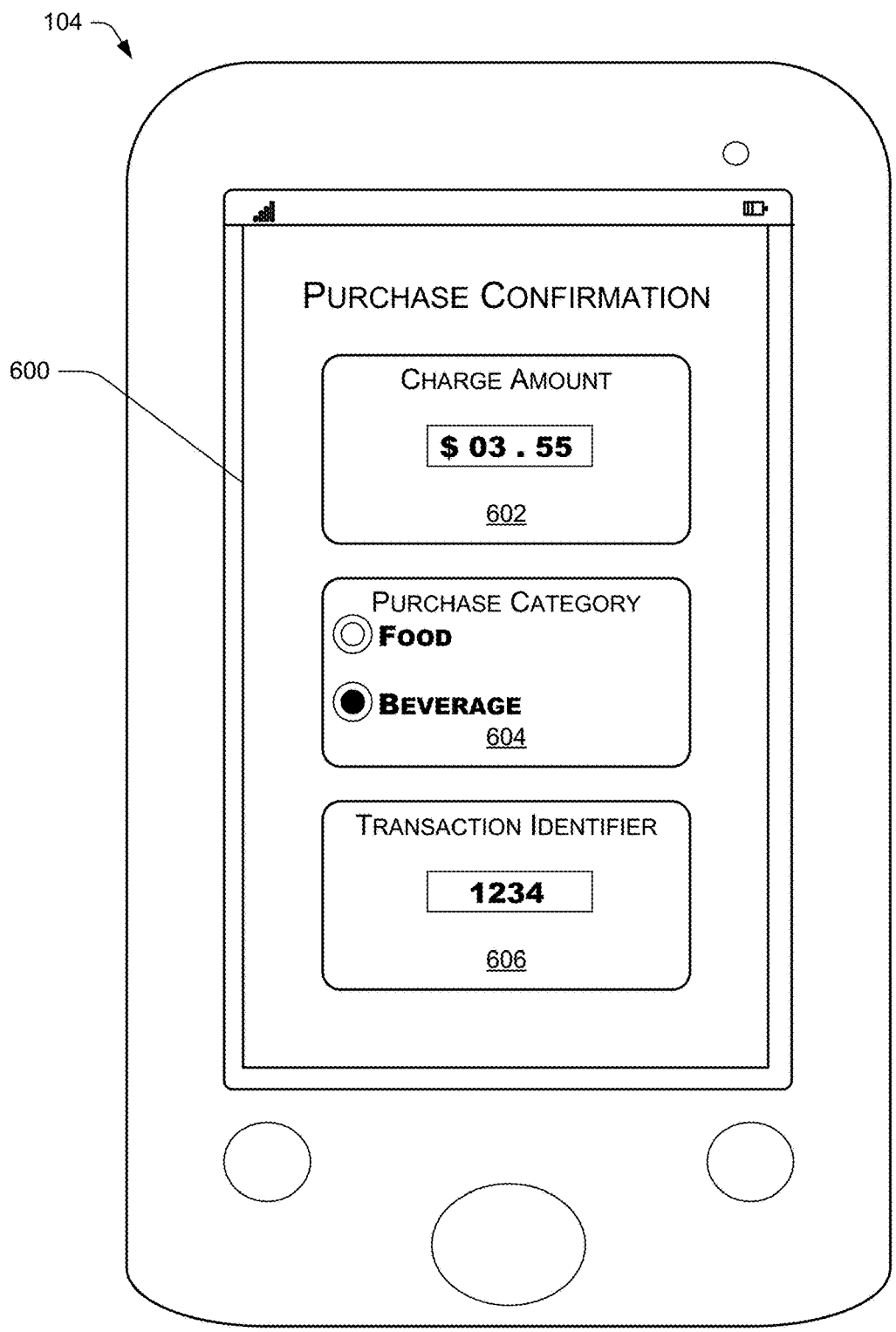
FIG. 6 shows an illustrative user interface for providing additional transaction information.

The memory 404 of the mobile device 104 may also include a transaction module 410. The transaction module 410 may send and receive information to and from the MTI 132 over path 130. The transaction module 410 may receive notifications from the MTI 132 regarding completed transactions and charges placed on an account associated with the mobile device 104 (e.g., the customer's bank account). The transaction module 410 may also generate requests to a user of the mobile device 104 for transaction information. FIG. 6 is an illustrative user interface showing examples of requests for transaction information.

This authorization module 412 may function to inform the user of the mobile device 104 that a MPA transaction was authorized (e.g., by the transaction reconciler 120). Alternatively, the authorization module 412 may request that the user confirm or authorize a transaction. A confirmation request may be presented to the user of the mobile device 104 showing the amount of a charge, the merchant, and possibly other transaction information. If the user authorizes the transaction, for example by pressing a button on the mobile device 104, the authorization is provided to the MTI 132 and processing of the MPA transaction continues.

Mobile device 104 also includes one or more input and output devices 414. The input and output devices may comprise one or more display devices 414, a keypad or keyboard 418, and a touch-screen 420 which may be combined with the display device 414. An antenna 422 in the mobile device 104 may send and receive wireless signals to and from the network 136. The device 104 may further comprise other input/output devices 424, such as an accelerometer, a microphone, a speaker, and the like.

The mobile device 104 also includes a clock 426, a location sensor 428, and a network interface 430. The clock 426 may provide a timestamp for communications sent from the mobile device 104. The location sensor 428 includes any sort of system that informs the mobile device 104 of its geolocation including, but not limited to, the Global Positioning System (GPS) of satellites circling the Earth. The location sensor 428 may additionally or alternatively determine geolocation by radio signal triangulation (e.g., triangulation based on radio antenna signal strength), receiving a notification from a fixed location (e.g., a beacon signal broadcasting a location).

The network interface 430 may be configured for wirelessly communicating with the network 136. The network interface 430 may use any standard protocols for network communication. In some implementations, the network interface 430 may use the antenna 422 to send and receive data from the network 136. In further implementations, the network interface 430 may provide information to the location sensor 428 (e.g., a closest network access point) from which the location sensor 428 can infer or calculate a location of the mobile device 104.

FIG. 5 shows an illustrative user interface 500 of the mobile device 104 that provides a user of the mobile device 104 with an option to check-in to a merchant. For example, if the merchant check-in module 408 of the mobile device 104 determines that the mobile device 104 is located at Merchant 1, then the user interface 500 may query the user to ask if he or she wishes to check in to Merchant 1 with, for example, a dialog box 502. The user interface 500 may present two buttons for the user to select "yes" 504 if he or she wishes to check in to Merchant 1 or "no" 506 if he or she does not. Although shown here as soft buttons on a display screen, the buttons 504 and 506 may be hard buttons or any other type of input technology for receiving a yes or no indication from the user.

The default behavior of the mobile device 104 if the user does not push either the yes button 504 or the no button 506 may be configured by the user. For example, unless the yes button 504 is pushed the mobile device 104 may not check-in to a merchant. Alternatively, the mobile device 104 may automatically check-in to a merchant unless the no button 506 is pressed.

In some situations the detected merchant (i.e., Merchant 1) may be incorrect. A merchant may move and if the merchant data 220 is not updated, correlation of the geolocation of the mobile device 104 to the stored merchant location may provide an incorrect result. Also, limits in the resolution of the location sensor 428 of the mobile device 104 may mis-identify the current merchant. For example, in a mall where many small stores are located close together it may be difficult for the mobile device 102 to accurate resolve its geolocation to the correct merchant. In such cases where the user realizes that his or her current location is not Merchant 1, the user may select button 508 to check-in to a different merchant. In response to the selection of button 508 the mobile device 104 may provide a list of other merchants in the same general area for the user to choose from and/or allow the user to manually enter the name of a merchant.

FIG. 6 shows an illustrative user interface 600 on the mobile device 104 for the user to provide additional transaction information. In some cases information beyond that automatically provided by the mobile device 104 to the MTI 132 may be needed in order to correctly identify which transaction to match to the mobile device. Types of additional information may include the amount of the MPA charge, a general description of the good/service that is the subject of the transaction, a specific identifier for the good/service, an identifier for the POS device used in the transaction, etc.

The user interface 600 may provide various dialog boxes for the user to confirm a purchase by entering information about the purchase. In a first dialog box the user may enter a charge amount 602 of the purchase or transaction (e.g., $3.55). By providing a charge amount 602 from the mobile device 104, the MTI 132 receives information from the customer side to compare with the charge amount provided by the merchant's POS device 108.

Another dialog box may provide a list from which the user can enter a general description of the purchase category 604. In this example, the transaction may be a purchase at a coffee shop. Items at the coffee shop are generally divided into drinks and beverages. By receiving an input from the user, such as selecting a radio button, indicating that the purchase was a beverage, the MTI 132 may be able to compare that with information provided by the POS device 108 that may indicate (e.g., by a product code) the transaction was for a cup of coffee. This may be used to differentiate the transaction from another MPA purchase of a food items. This type of differentiating information may be especially useful if multiple transactions are for the same amount (e.g., $2.25 for a latte and $2.25 for a muffin).

An additional type of dialog box that may be presented on the user interface 600 is a dialog box for entering a transaction identifier 606 that may specifically identify a good/service that is the subject of the transaction, an identification number of the POS device 108, or other transaction identifier. A transaction may serve as a confirmation to make sure the correct customer is charged and as additional data to differentiate otherwise similar transactions. A transaction identifier that specifically identifies a good/service may be a product ID such as a universal product code (UPC) or similar. When using an identification number for the POS device 108, the clerk 106 may tell the customer (A) 102 the ID or other number associated with the POS device 108 used in the transaction and customer (A) 102 may enter this number in the transaction identifier field provided in the dialog box 606.

The dialog boxes 602, 604, and 606 discussed above may be present in any combination on the user interface 600. In some implementations, the MTI 132 and/or the mobile device 104 may determine what information is necessary to uniquely identify a transaction and present the appropriate dialog boxes (or other interface elements such as spoken questions for an audio user interface) to the user of the mobile device 104.

Illustrative Processes

These processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 7:
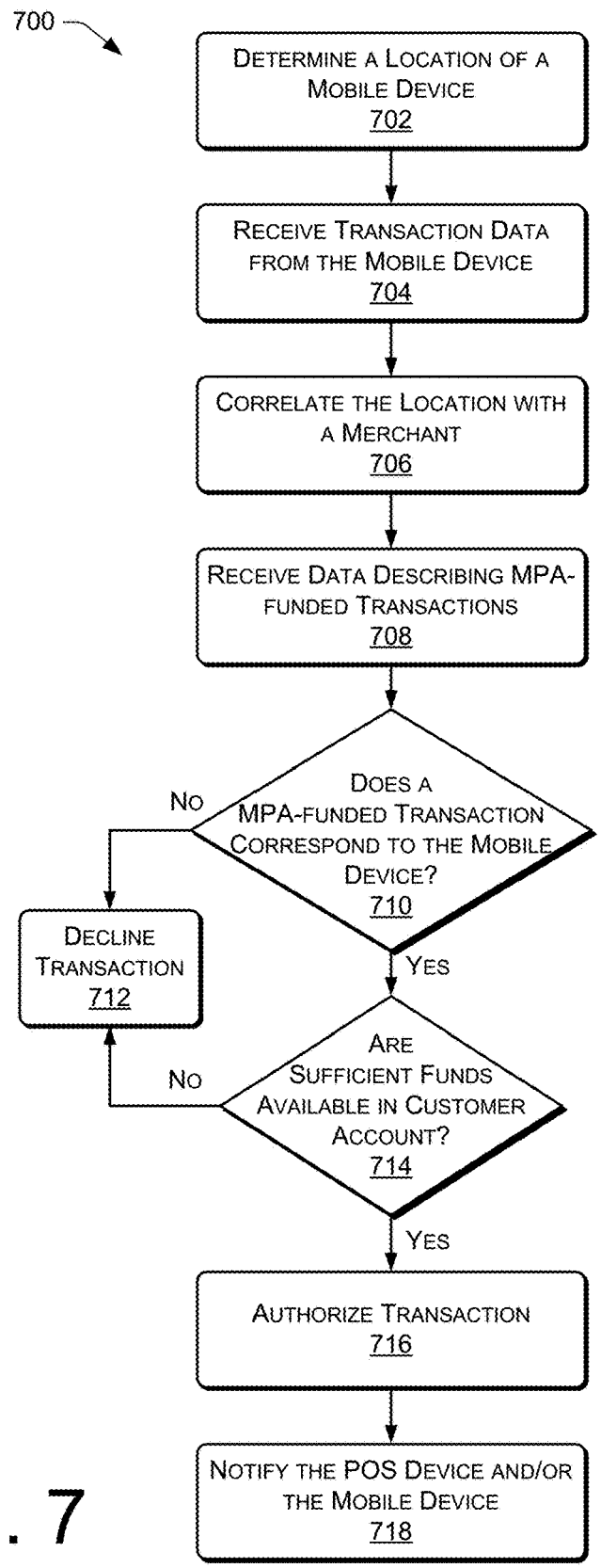
FIG. 7 is a flow diagram of an illustrative process for matching a transaction with a mobile device.

FIG. 7 is an illustrative process 700 for matching a transaction with a mobile device. In some implementations, process 700 may be performed by the MTI 132, the payment reconciler 120, or a combination of both.

At 702, the location of a mobile device is determined. The location of the mobile device may be determined by receiving an indication that provides the current geolocation of the mobile device. The geolocation may be provided as latitude and longitude or other coordinates indicating a geographic location. The location of the mobile device may also be provided by an indication of a relative location of the mobile device. For example, if the user of the mobile device has checked-in to a merchant, a notification that the mobile device has checked into the merchant may provide the location of the mobile device (i.e., the mobile device is at the merchant). The location data may also include an associated time or a timestamp thus providing both a "where" and "when" for the mobile device's location. The time may be provided by the clock 426 of the mobile device shown in FIG. 4.

At 704, transaction data is received from the mobile device. The transaction data may be an amount of a charge to pay for the transaction. The amount of the change may be provided by the user of the mobile device through, for example, dialog box 602 of the user interface 600 shown in FIG. 6. The transaction data may also include other types of information about the transaction such as a passphrase or user identifier that the user provided to the POS device used for the transaction. The transaction data may additionally or alternative include an identifier of the POS device (e.g., a terminal ID), a general description of a good/service that is the subject the transaction and/or a specific identifier of a good/service that is the subject of the transaction. The descriptions and identifiers of the good/service of the transaction may be provided by the user of the mobile device using the user interface 600 shown in FIG. 6.

At 706, the location of the mobile device is correlated with a merchant location. In some implementations, coordinates such as latitude and longitude provided by the mobile device may be compared to a map of merchant locations to determine if the mobile device is at, or within predetermined proximity of, a merchant. The map of merchant locations may be stored as part of the merchant data 220 shown in FIG. 2. However, the merchant locations may be stored as a part of any data structure not only a map. There may be locations at which the geolocation of the device can be identified; however, that geolocation might not correlate with any merchant location. For example, the device may be on a street near to several merchants but not located at any of those merchants.

When the location of the mobile device is determined by receiving an indication that the mobile device has check in to a merchant, correlating the location of the mobile device with the merchant may be done simply by noting that the mobile device is located at the merchant.

At 708, data describing MPA-funded transactions is received from a POS device at the merchant. This data may include a time of the transaction and an amount of a charge to pay for the transaction. The time of the transaction may be provided by the clock 330 of the POS device shown in FIG. 3. Data about multiple transactions may be provided by the POS device in a batch. Data for each of the transactions may include a charge amount and a time of the respective transactions. The data describing MPA-funded transactions may also include a passphrase or user identifier provided by the user of the mobile device to the POS device.

Figure 9:
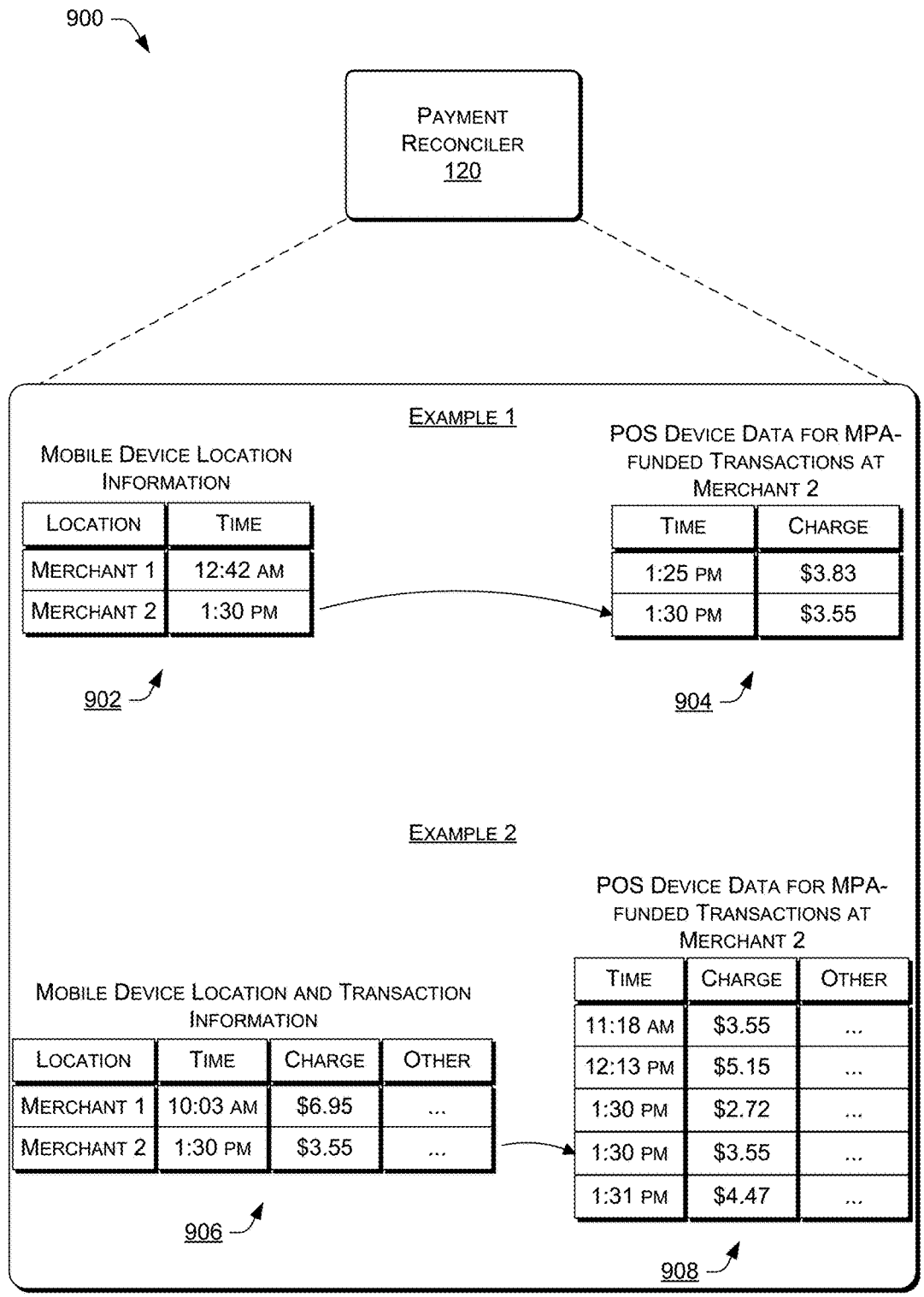
FIG. 9 shows illustrative data from the mobile device and from the POS device that is accessible by the mobile transaction infrastructure.

At 710, it is determined if one of the MPA transactions matches the mobile device. Illustrative matching data are shown in FIG. 9. One of the MPA-funded transactions may be matched with the mobile device by identifying a time when the mobile device was located at the merchant and identifying from the data describing MPA-funded transactions provided at 708 a transaction at the merchant that occurred at about the same time. For example, the MTI 132 shown in FIG. 1 may receive data from a POS device at a coffee shop reporting that an MPA transaction occurred at 1:30 PM for a purchase of a cup of coffee costing $1.10. The MTI 132 may also receive indication from a mobile device that the mobile device has been present at the coffee shop since 1:28 PM and was still present at the coffee shop at 1:30 PM. If there is only one mobile device present at the coffee shop during that time period, then the it may be inferred that the $1.10 coffee transaction was initiated by the user of the mobile device. In some instances, the clocks of the mobile device and a POS device may be set to different times so allowing approximate time matching such as within a one minute window may improve implementation of this technique.

The determination may match a one of the MPA-funded transactions received from the POS device with the mobile device may also be based upon the location of the mobile device, transaction data from the mobile device, and data from the POS device. The transaction data provided by the mobile device may be any of the types of transaction data discussed above such as a the amount of a charge for the transaction, passphrase or user identifier, an identifier for the POS device, a general description of the good or service of the transaction, a specific identifier of the good or service of the transaction, and the like. Data from the POS device may include an identifier of the POS device, a general or specific description or numeric identifier of the good/service that is the subject of the transaction, or other types of data about the transaction.

For example, the mobile device may transmit its location and current time. In some implementations, this may be performed in response to the user of the mobile device checking-in to a merchant on the mobile device. The user of the mobile device may tell a clerk at the merchant that he or she wishes to pay for a purchase using MPA and the clerk may press an MPA button on the POS device then enter the amount of the transaction charge on the POS device. The user may also enter the amount of the charge on his or her mobile device. When the charge amount provided by the POS device and the charge amount provided by the mobile device match, the MPA transaction may be matched with the mobile device.

When there are no matching transactions, process 700 proceeds along the "no" path to 712 and the transaction is declined. This may be communicated to the POS device and the POS device may display a message informing a clerk that the transaction is declined.

At 714, it is determined if sufficient funds for the transaction are available in a customer account. Similar to checks performed when making a credit card purchase, there may be a confirmation step in MPA transactions that determines if enough money or a sufficient line of credit exists to fund the transaction. For example, the payment reconciler 120 may request a confirmation that sufficient funds are available to pay for the transaction and then, if sufficient funds exists, receive a confirmation that the account associated with the mobile device has sufficient funds to pay for the transaction. When there are sufficient funds in the customer's account, process 700 proceeds along "yes" path to 716.

If the customer account does not have sufficient funds to pay for the transaction, process 700 proceeds along the "no" path to 714 where the transaction is declined.

At 716, the transaction is authorized. In some implementations, the authorization may be performed by the authorization module 210 of the payment reconciler 120 shown in FIG. 2. The authorization may also instruct the credit card interchange 126 to fund the transaction.

At 718, the POS device and/or the mobile device are notified that the transaction is authorized. The authorization may be displayed on a display of the POS device at which point the clerk provides the good or service to the customer. When reported to the mobile device, a notification that the transaction has been authorized may also inform the user of the mobile device that the transaction charge has been withdrawn from his or her account.

Figure 8:
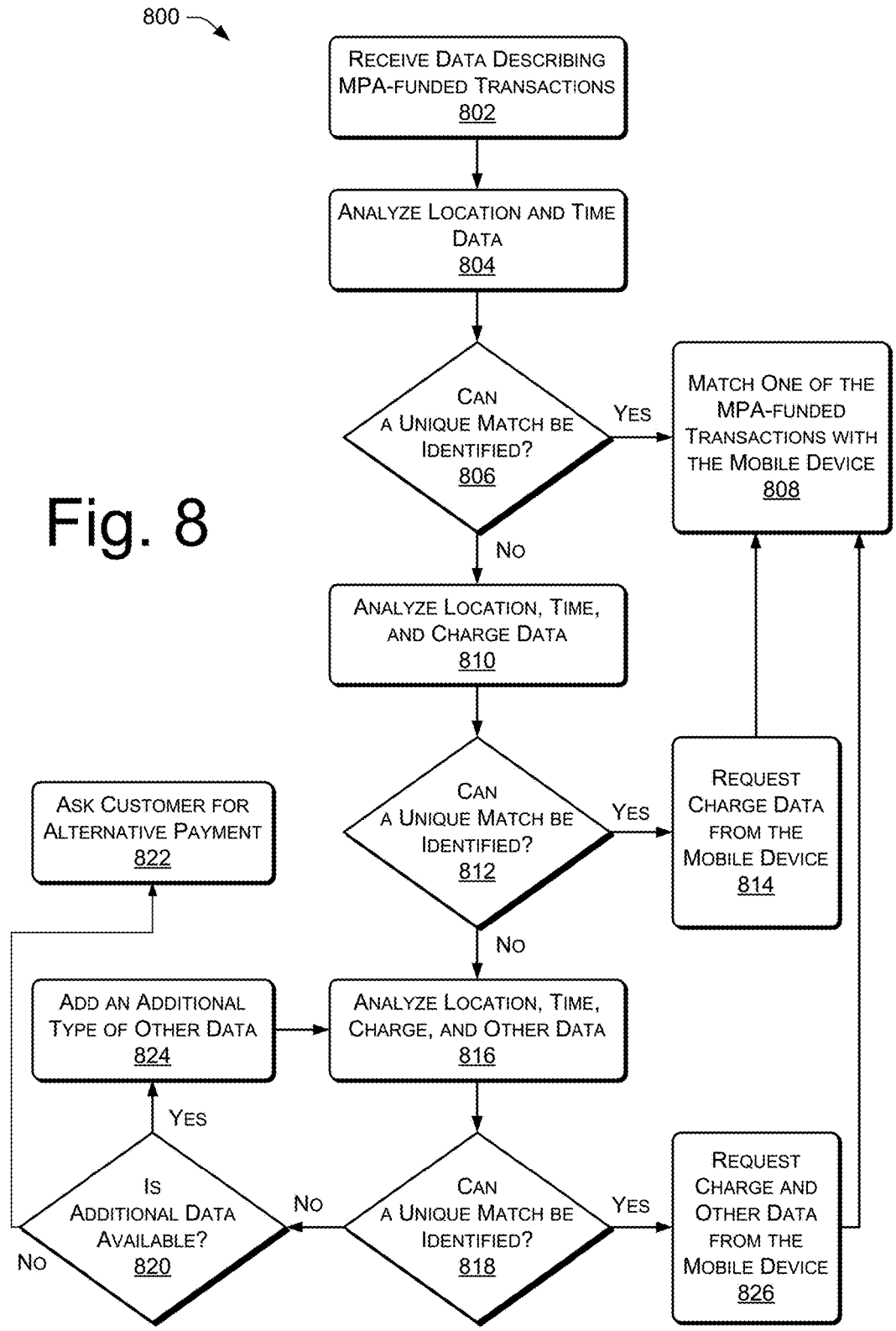
FIG. 8 is a flow diagram of an illustrative process for determining sufficient information to uniquely identify a mobile device as matched with a transaction.

FIG. 8 is an illustrative process 800 for determining if there is sufficient information to uniquely identify a mobile device as matched with a transaction. In some implementations, process 800 may be performed by the payment reconciler 120, for example, process 800 may be performed by the unique identification module 214 of the payment reconciler 120.

At 802, data describing MPA-funded transactions is received. This may be similar to the data received at 702, 704, and/or 710 in FIG. 7. This data may be received from a POS device and/or from a mobile device. The MPA-funded transaction data may include information about the locations of POS devices and mobile devices, times of the transactions, an amount of money charged for transactions, and other data. In a merchant with multiple POS devices (e.g., a grocery store with several checkout lanes) each of the devices may have the same location but process different transactions.

At 804, location and time data is analyzed. This analysis may be performed by the transaction matching module 208 of the MTI 132 shown in FIG. 2. The analysis may include identifying matching pieces of data from POS devices and from mobile devices. For example, a given POS device may indicate that an MPA-funded transaction occurred at 1:30 PM and one or more mobile devices may also indicate that they were present at the same merchant as the POS device sometime between 1:29 PM and 1:31 PM. This could be recognized as a match for each of the mobile devices.

Next, at 806 it is determined if a unique match can be identified from the location and time data. The identification of a unique match may be performed by the unique identification module 214 of the MTI 132 shown in FIG. 2. In some circumstances, location and time data may be sufficient to uniquely match a transaction provided by a POS device with one mobile device. If so, process 800 proceeds along the "yes" path to 808.

At 808, one of the MPA-funded transactions is matched with the appropriate mobile device. This matching may be similar to the matching determination made at 712 in FIG. 7. Once uniquely matched, the transaction may continue such as, for example, shown in 716, 718, and 720 of FIG. 7.

If a unique match cannot be identified from the location and time data, process 800 proceeds along the "no" path to 810. At 810, charge data is analyzed in addition to location and time data. The charge data may be provided by the POS device (e.g., based on scanning a barcode of the item to be sold or by a clerk typing numbers on the keypad) and by the mobile device (e.g., as entered by a user of the mobile device such as in user interface as shown in FIG. 6). By further analyzing charge data, it may be possible to distinguish two MPA transactions that occurred at the same merchant at about the same time but for different amounts.

At 812, it is determined if a unique match can be identified from the location, time, and charge data. The POS device may typically provide charge data when submitting an MPA transaction similar to how the POS device provides charge data when submitting a credit card transaction. However, to minimize user friction, requests for charge data from the user of the mobile device (e.g., through the user interface shown in FIG. 6) may be made only when necessary. In some implementations, every transaction above a certain threshold amount (e.g., $20) may require that the user of the mobile device manually enter charge data to confirm the transaction. If it is determined that a unique match would be possible if charge data was available from the mobile device, then process 800 proceeds along the "yes" path to 814.

At 814, charge data is requested from the mobile device. When charge data is received, process 800 proceeds to 808 where a unique match is made using the location, time, and charge data. If it is still not possible to uniquely to match a transaction with a mobile device when charge data is available, process 800 proceeds along the "no" path to 816.

At 816, other data is analyzed in addition to the location, time, and charge data. This other data may include any type of transaction data such as a passphrase identifying the user of the mobile device, a identifier of the POS device used in the transaction, a general description of a good/service that is the subject the transaction, a specific identifier of a good/service that is the subject of the transaction, a default payment source for the transaction (e.g., a Visa® credit card is the default payment source for the user's MPA transactions), etc.

At 818, it is determined if a unique match can be identified from the location, time, charge, and other data. If more than one type of other data is necessary to identify a unique match, process 800 proceeds along "no" path to 820.

At 820, it is determined if any additional types of data are available. If additional types or data are not available and a unique match cannot be identified from the available data, process 800 proceeds along the "no" path to 822 where the customer is asked for an alternative form of payment.

When additional data is available, process 800 proceeds along "yes" path to 824. At 824, an additional type of other data is added. From 824, process 800 returns to 816 and analyzes the available data including the additional type of other data. This addition of multiple types of other data may proceed iteratively until it is possible to uniquely match a mobile device with a transaction or until there is no more other data to analyze.

Once the extent of other data necessary to unique identify a match has been determined, process 800 proceeds from 818 along "yes" path to 826.

At 826, the charge data and other data are requested from the mobile device. The other data may be requested through dialog boxes on a user interface of the mobile device such as dialog boxes 604 and 606 shown in FIG. 6. Requests for charge data and/or additional data from the mobile device may be withheld until it is determined what pieces of data are necessary to uniquely identify a match. By doing so, the user of them mobile device will enter data on the mobile device only once in order to uniquely identify the MPA transaction.

Once the charged data and any other data needed to unique identify a match has been received from the mobile device, process 800 proceeds from 826 to 808 where one of the MPA-funded transactions is matched with the mobile device.

FIG. 9 shows illustrative data structures containing information from the mobile device and information from a POS device that may be analyzed to determine if a unique match exists. As discussed above, this analysis may be performed by the transaction matching module 208 and/or the unique identification module 214 of the payment reconciler 120 as shown in FIG. 2.

In a first example shown in FIG. 9, mobile device location information 902 shows that the mobile device was at two merchants during the course of the day. The mobile device was at Merchant 1 at 12:42 AM and later at Merchant 2 at 1:30 PM. This location and time information may be provided by the mobile device automatically to the MTI 132. The time and location data may also be provided each time a user of the mobile device checks in to a merchant. In such implementations, the time may be the moment in time when the user checked in to the respective merchant even though the mobile device may be at each merchant for an extended period of time. This data provided by the mobile device may not include any transaction information but only location and time information.

The payment reconciler 120 may also receive data from POS devices about MPA-funded transactions. Although data from many hundreds or thousands of merchants may provide data to the payment reconciler 120, for the sake of clarity only data from Merchant 2 904 is shown in this example. Recall that MPA transactions may be initiated by a customer merely indicating to a clerk that he or she wishes to pay for a purchase with a MPA. Thus, the data provided by a POS device may not include any information about the mobile device. The illustrative POS data 904 includes a time of each MPA transaction and the amount of a charge for each of the MPA transactions.

In this first example, the payment reconciler 120 may compare the location of the mobile device at 1:30 PM, determine that the mobile device is located at Merchant 2 and then proceed to analyze the POS device data from Merchant 2 904. The POS device data 904 shows that at 1:30 PM there was a MPA-funded transaction for $3.55. This may be recognized as a match by the transaction matching module 208 of the payment reconciler 120.

In the second example shown in FIG. 9 it is not possible to uniquely identify a matching transaction based on location and time data alone. Mobile device location and transaction information 906 contains information that may be provided automatically by the mobile device and manually by the user of the mobile device, for example, in response to a query for additional information such as an amount of an authorized charge.

Similar to the first example, by receiving an indication that the mobile device is located at Merchant 2 at 1:30 PM, the MTI 132 may access POS device data for MPA-funded transactions at Merchant 2 908. Examination of the POS data 908 shows that two transactions occurred at 1:30 PM: one for $2.72 and another for $3.55. The probability of two MPA transactions occurring at the same merchant at the same time may increase with the number of people using MPA to pay for transactions and the number of simultaneous transactions (e.g., the number of POS devices) that can be processed by a merchant. For example, if this method of payment is prevalent it may be a common occurrence for big-box stores with tens of checkout lanes to process multiple MPA transactions every minute.

Given that two transactions occurred at Merchant 2 at 1:30 PM it may not be possible to accurately match the transaction with appropriate mobile device without additional information. As discussed above, this determination may be made by the unique identification module 214 of the payment reconciler 120. The MTI 132 may request that the user of the mobile device enter the amount of the charge and when the MTI 132 receives an indication that the charge amount was for $3.55 it may provide this to the payment reconciler 120 in order to match the transaction with the mobile device.

In situations in which location, time, and charge data is not sufficient to uniquely identify a transaction, the payment reconciler 120 may direct the MTI 132 to request other transaction data and then the payment reconciler 120 can perform the analysis and matching shown above in 816, 818, and 820 of FIG. 8. For example, if both of the transactions which occurred at 1:30 PM where for $3.55 then a passphrase may be used to differentiate the two customers and their two mobile devices.

In this situation, one customer may say that he wishes to purchase a $3.55 item with MPA and that his passphrase is "feisty mango" and the second customer may say that she wishes to purchase another item which also costs $3.55 with MPA and her passphrase is "ubiquitous salmon." Each of the two respective clerks helping the two customers may enter the passphrases as well as the other transaction information into the POS devices. Then the passphrase information is sent to the MTI 132 as part of the POS device data 908. The two users may each be asked to enter his or her passphrase as well as the transaction amount into their respective mobile devices. This information may also be provided to the MTI 132 as part of the mobile device location and transaction information 906. By receiving the passphrases from both the mobile device side and from the POS device side the MTI 132 may be able to provide the payment reconciler 120 with information sufficient to uniquely match the two $3.55 transactions with the correct mobile devices.

In addition to or instead of the passphrases, any of the various types of other transaction information discussed above may be provided to the MTI 132 and in turn to the payment reconciler 120 in order to uniquely identify a transaction.

Figure 10:
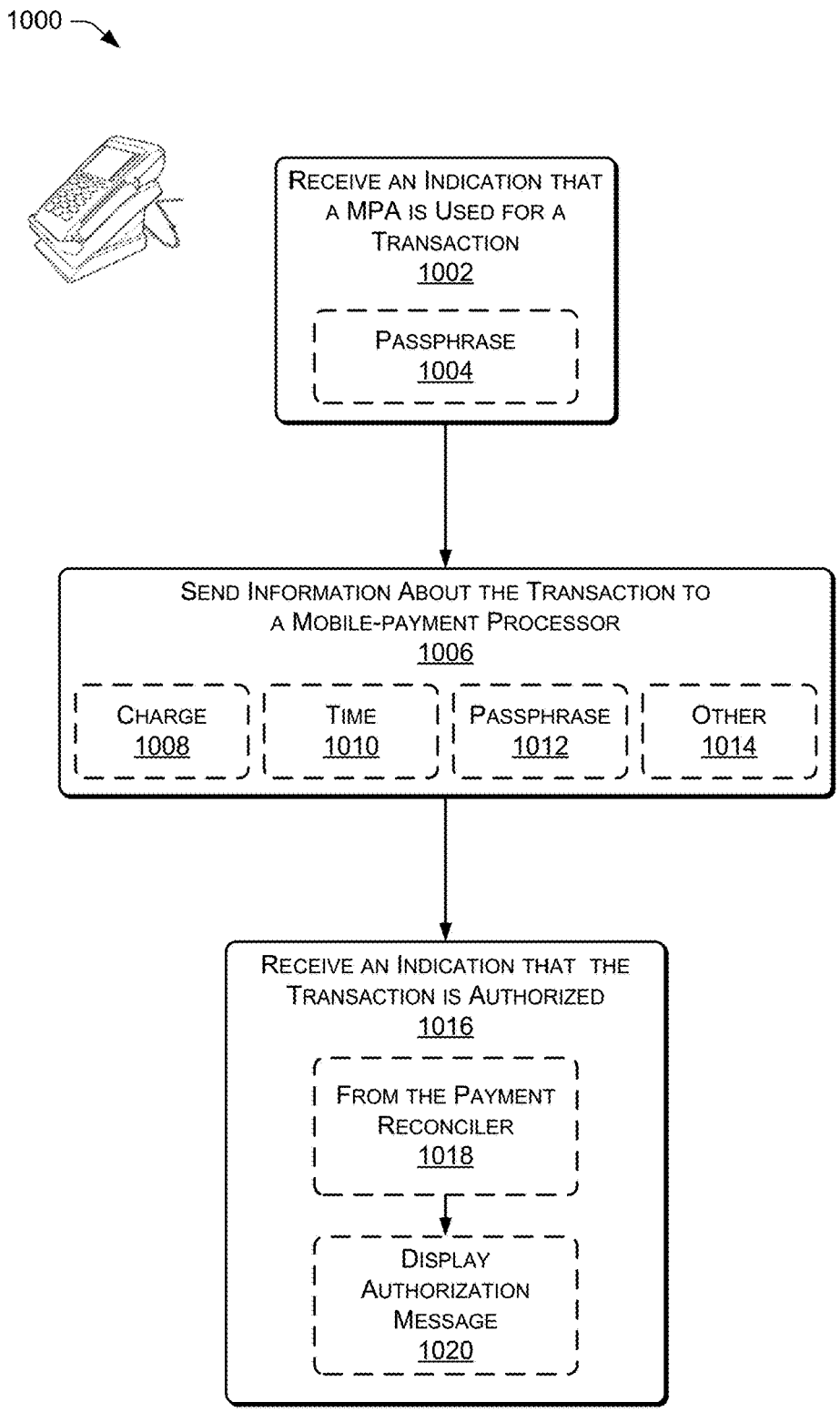
FIG. 10 is a flow diagram of an illustrative process for sending information about a transaction to a mobile transaction infrastructure.

FIG. 10 shows an illustrative process 1000 for sending information about a transaction to a gateway provider or payment processors such as the payment reconciler 120 shown in FIG. 1. In some implementations, process 1000 may be performed by the POS device 108.

At 1002, an indication that a MPA is used for a transaction is received. In some implementations, the indication is provided to a POS device used for the transaction by a clerk or by a customer (e.g., during self-checkout). For example, instead of pressing a credit card button on the POS device the clerk or customer may press a MPA button. The indication may also be generated in other ways such as, for example, by scanning a barcode or by entering a text or number code into the POS device.

The indication may also include a passphrase 1004 provided by the user of the mobile device. The passphrase may be a user identifier or user name. As explained above, the customer may tell a clerk that he or she wishes to pay with MPA and that his or her passphrase is "feisty mango." In response, the clerk may press an MPA button on the POS device and type in "feisty mango."

At 1006, information about the transaction is sent to a payment reconciler. Information sent to the payment reconciler may be sent from a POS device 108 along paths 122, 126, and 134 shown in FIG. 1. Many types of transaction information may be sent. For example, the information about the transaction may include a charge 1008 for the transaction and a time 1010 of the transaction. After receiving the passphrase at 1004, the passphrase 1012 may also be sent as part of the transaction information.

Other types 1014 of transaction information may be sent to the mobile transaction infrastructure. The other types 1014 of transaction information may include an identifier of the POS device used in the transaction (e.g., the POS device may attach its device ID to the other transaction information), a general description of a good/service that is the subject the transaction (e.g., food, gasoline, etc.), and/or a specific identifier of a good/service that is the subject of the transaction (e.g., an item number).

At 1016, an indication that the transaction is authorized is received. As discussed above, the user of the mobile device may indicate that he or she authorizes the transaction or the payment reconciler may analyze the transaction and determine that the transaction is authorized. The authorization module 310 of the POS device 108 shown in FIG. 3 may receive and process the indication that the transaction is authorized.

Transactions authorized by either the user of the mobile device or by the payment reconciler are both sent from the payment reconciler to the POS device. In such implementations, the POS device will receive an indication from the payment reconciler at 1018 that the transaction is authorized. Next at 1020, the POS device may display an authorization message and allow a clerk operating the POS device to finalize the transaction.

Figure 11:
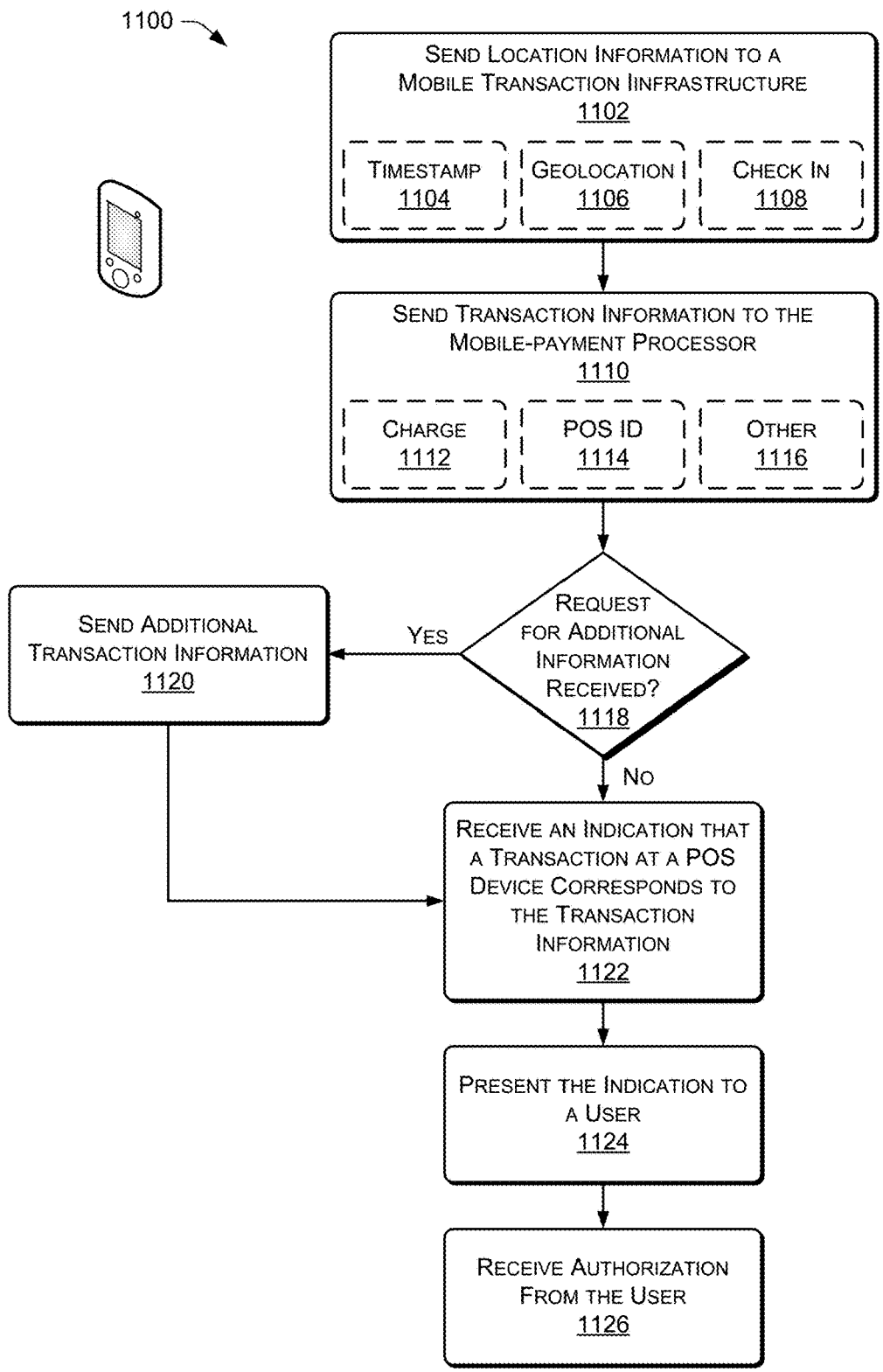
FIG. 11 is a flow diagram of an illustrative process for sending information about a transaction to a mobile transaction infrastructure.

FIG. 11 shows an illustrative process 1100 for sending information about a transaction to a mobile transaction infrastructure. In some implementations, process 1100 may be performed by the mobile device 104.

At 1102, location information is sent to a mobile transaction infrastructure. In some implementations, the location information may also include a timestamp 1104 indicating the time when the location information was acquired. Location information may be a geolocation 1106 that provides coordinates or other data showing an absolute position of the mobile device. In other implementations, the location information may be obtained by determining that the mobile device is located at a merchant and the user of the mobile device checking in 1108 to the merchant. The check-in may be implemented using a user interface such as the user interface shown in FIG. 5. In this implementation, rather than sending absolute location information (e.g., latitude and longitude) that corresponds to a geographic location, the mobile device may send contextual location information (e.g., at Starbucks®) indicating that the mobile device is present at a particular merchant. In implementations in which process 1100 is performed by the mobile device 104 shown in FIG. 1, information may be sent from the mobile device 104 to the MTI 132 through the network 128 and via path 130.

At 1110, transaction information is sent to the mobile transaction infrastructure. The transaction information may include an amount of a charge 1112 for the transaction, an identifier for the POS device 1114 used in the transaction, or other types 1116 of transaction information. This transaction information may be provided by a user of the mobile device through a user interface such as the user interface shown in FIG. 6.

At 1118, is determined if a request from the mobile transaction infrastructure for additional transaction information was received. This determination may be performed by a gateway provider or a payment processor such as the payment reconciler 120 show in FIGS. 1 and 2. This request may be sent by the mobile transaction infrastructure when the transaction information is insufficient to uniquely identify the transaction. As discussed above, the determination as to whether or not a unique match or transaction can be identified may be performed by the unique identification module 214 shown in FIG. 2. The request may identify transaction information necessary to identify a unique match between the mobile device and a transaction. For example, the request could inform the user of the mobile device that the amount of the transaction charge is necessary to uniquely identify the transaction. If a request for additional transaction information was received, process 1100 proceeds along the "yes" path to 1120.

At 1120, the additional transaction information requested at 1118 is sent to the mobile transaction infrastructure and forwarded to the payment reconciler. If a request for additional transaction information was not received at 1118 (e.g., time and location information were sufficient to uniquely match the mobile device to a transaction), process 1100 proceeds along the "no" path to 1122. Also, once the additional transaction information was sent at 1120, process 1100 proceeds to 1122.

At 1122, an indication is received from the payment reconciler that indicates a transaction at a POS device located at the same merchant as the mobile device matches the transaction information sent to the mobile transaction infrastructure from the mobile device. The indication that a match exists may provide the mobile device with the results of a comparison between two sets of data, one set from the mobile device and one set from a POS device, such as the comparisons shown in FIG. 9.

At 1124, the indication that a match exists may be presented to the user of the mobile device. For example, a display 414 of the mobile device may show a message stating that a match exists. Of course, the indication may also be presented by a sound or other technique besides a visual display.

At 1126, authorization to pay for the transaction may be received from the user of the mobile device. In some implementations, this may be a part of process 1100 in which the user must affirmatively indicate on his or her mobile device that he or she approves of the MPA-funded transaction. This may help to reduce fraudulent use of the MPA payment system. For example, an unscrupulous individual who knows that someone else has an MPA-enabled mobile device in the same merchant location might be tempted to purchase something using MPA with the hopes that the charge would be automatically associated with the other person's mobile device. However, if authorization from the user is required then the person in possession of the mobile device will see an unfamiliar transaction on his or her mobile device (e.g., the matching indication presented at 1124) and choose not to authorize the transaction. In some implementations, the necessity for receiving authorization from the user may be based on the amount of the charge (e.g., expensive transactions may need manual authorization whereas low value transactions may be automatically authorized).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable storage media storing computer-executable instructions that, when executed by one or more processors, instruct one or more devices of a computing system to perform operations comprising:
   receiving location data of a location of a mobile device;
   correlating the location of the mobile device with a location of a merchant based at least in part on the location data;
   receiving, from a point-of-sale (POS) device operating at the location of the merchant at least in response to the POS device processing one or more transactions with one or more mobile devices, POS data describing multiple mobile-payment account (MPA) funded transactions based at least in part on occurrence of the one or more transactions during a particular time period;
   receiving transaction data from the mobile device, the transaction data associated with a transaction between the mobile device and the POS device and comprising a timestamp;
   identifying an MPA-funded transaction out of the multiple MPA-funded transactions based at least in part on the location of the mobile device being correlated with the location of the merchant and on a match between the particular time period and the timestamp;
   determining that the MPA-funded transaction is authorized based at least in part on a mobile payment account associated with the mobile device; and
   providing a notification to at least one of the mobile device or the POS device that the MPA-funded transaction is authorized, the notification automatically presented at a user interface.

2. The one or more non-transitory computer-readable storage media of claim 1, wherein the location data is received from a location sensor of the mobile device and comprises a geolocation of the mobile device, and wherein correlating the location of the mobile device with the location of the merchant comprises:
   maintaining a data store comprising merchant information that at least identifies:
      a set of merchants that accept payments funded by mobile payment accounts; and
      a set of locations corresponding to the set of merchants;
   determining, based at least in part on the merchant information and the geolocation of the mobile device, that the mobile device is located within a threshold distance of the location of the merchant from the set of merchants.

3. The one or more non-transitory computer-readable storage media of claim 2, wherein the user interface is presented at the mobile device, and wherein correlating the location of the mobile device with the location of the merchant further comprises:
   requesting, based at least in part on the mobile device being location with the threshold distance of the location of the merchant, a confirmation from the mobile device that the mobile device is at the location of the merchant; and
   receiving, based at least in part on user input at the user interface, the confirmation from the mobile device.

4. The one or more non-transitory computer-readable storage media of claim 1, wherein the user interface is presented at the mobile device, wherein the location data comprises a check-in that the mobile device is at the location of the merchant, wherein the location of the mobile device is correlated with the location of the merchant based at least in part on the check-in, wherein the check-in is received from the mobile device based at least in part on user input at the user interface in response to a request for the check-in, and wherein the request is automatically presented at the user interface based at least in part on a comparison of a geolocation of the mobile device to the location of the merchant.

5. The one or more non-transitory computer-readable storage media of claim 1, wherein the transaction data comprises a charge amount, wherein the charge amount is entered at a first user interface of the mobile device, wherein the POS data comprises multiple charge amounts corresponding to the multiple MPA-funded transactions, and wherein the MPA-funded transaction is identified based at least in part on a match between the charge amount and one of the multiple charge amounts.

6. The one or more non-transitory computer-readable storage media of claim 1, wherein the transaction data comprises a passphrase associated with the mobile payment account, wherein the POS data comprises multiple passphrases corresponding to the multiple MPA-funded transactions and entered at the POS device, and wherein the MPA-funded transaction is identified based at least in part on a match between the passphrase and one of the multiple passphrases.

7. The one or more non-transitory computer-readable storage media of claim 1, wherein the transaction data comprises an identifier of the POS device, wherein the identifier is entered at a first user interface of the mobile device, wherein the POS data comprises the identifier of the POS device, and wherein the MPA-funded transaction is identified based at least in part on the identifier of the POS device being common to the transaction data and to the POS data.

8. The one or more non-transitory computer-readable storage media of claim 1, wherein the transaction data comprises an identifier of the mobile payment account, wherein the identifier is entered at a first user interface of the mobile device, wherein the POS data comprises identifiers of multiple mobile payment accounts corresponding to the multiple MPA-funded transactions, and wherein the MPA-funded transaction is identified based at least in part on a match between the identifier of the mobile payment account and one of the identifiers.

9. The one or more non-transitory computer-readable storage media of claim 1, wherein the transaction data comprises a description of a category of a good or service involved in the MPA-funded transaction, wherein the POS data comprises descriptions of categories of multiple goods or services involved in the multiple MPA-funded transactions, and wherein the MPA-funded transaction is identified based at least in part on a match between the description and one of the descriptions.

10. The one or more non-transitory computer-readable storage media of claim 1, wherein the transaction data comprises an identifier unique to a good or service involved in the MPA-funded transaction, wherein the identifier is entered at a first user interface of the mobile device, wherein the POS data comprises identifiers unique to multiple goods or services involved in the multiple MPA-funded transactions, and wherein the MPA-funded transaction is identified based at least in part on a match between the identifier and one of the identifiers.

11. A computer-implemented method comprising:
   receiving, by one or more devices of a computing system, location data of a location of a mobile device;
   correlating, by at least on one of the one or more devices of the computing system, the location of the mobile device with a location of a merchant based at least in part on the location data;
   receiving, by at least on one of the one or more devices of the computing system and from a point-of-sale (POS) device operating at the location of the merchant at least in response to the POS device processing one or more transactions with one or more mobile devices, POS data describing multiple mobile-payment account (MPA) funded transactions based at least in part on occurrence of the one or more transactions during a particular time period;
   receiving, by at least on one of the one or more devices of the computing system, transaction data from the mobile device, the transaction data associated with a transaction between the mobile device and the POS device and comprising a timestamp;
   identifying, by at least on one of the one or more devices of the computing system, an MPA-funded transaction out of the multiple MPA-funded transactions based at least in part on the location of the mobile device being correlated with the location of the merchant and on a match between the particular time period and the timestamp;
   determining, by at least on one of the one or more devices of the computing system, that the MPA-funded transaction is authorized based at least in part on a mobile payment account associated with the mobile device; and
   providing, by at least on one of the one or more devices of the computing system, a notification to at least one of the mobile device or the POS device that the MPA-funded transaction is authorized, the notification automatically presented at a user interface.

12. The computer-implemented method of claim 11, wherein each of the transaction data and POS data excludes an identifier of the mobile payment account, and further comprising:
   adding, based at least in part on the MPA-funded transaction being authorized, the identifier of the mobile payment account to the MPA-funded transaction to generate an updated MPA-funded transaction; and
   sending the updated MPA-funded transaction to a payment reconciler system.

13. The computer-implemented method of claim 12, wherein user interface is presented at the POS device, and wherein the notification includes information about completion of the MPA-funded transaction based at least in part on the updated MPA-funded transaction being sent to the payment reconciler system.

14. The computer-implemented method of claim 11, further comprising:
   determining that the timestamp and the correlating of the location of the mobile device with the location of the merchant are insufficient to identify the MPA-funded transaction out of the multiple MPA-funded transactions; and
   directing, based at least in part on the timestamp and the correlating being insufficient to identify the MPA-funded transaction, a request for additional transaction-related data to at least one of the mobile device or the POS device.

15. The computer-implemented method of claim 14, wherein the request is directed to the mobile device and solicits, as the additional transaction-related data, at least one of: a change amount of the MPA-funded transaction, an identifier of the POS device, a general description of a good or service that is the subject of the MPA-funded transaction, or a specific identifier of the good or service, and wherein the MPA-funded transaction is identified out of the multiple MPA-funded transactions based at least in part on the additional transaction-related data received from the mobile device in response to the request.

16. The computer-implemented method of claim 14, wherein the request is directed to the POS device and solicits, as the additional transaction-related data, at least one of: an identifier of the mobile payment account or a passphrase associated with the mobile payment account, and wherein the MPA-funded transaction is identified out of the multiple MPA-funded transactions based at least in part on the additional transaction-related data received from the POS device in response to the request.

17. A computing system comprising:
   one or more processors; and
   one or more non-transitory computer-readable storage media storing computer-executable instructions that, when executed by the one or more processors, configure the computing system to at least:
   receive location data of a location of a mobile device;
   correlate the location of the mobile device with a location of a merchant based at least in part on the location data;
   receive, from a point-of-sale (POS) device operating at the location of the merchant at least in response to the POS device processing one or more transactions with one or more mobile devices, POS data describing multiple mobile-payment account (MPA) funded transactions based at least in part on occurrence of the one or more transactions during a particular time period;

receive transaction data from the mobile device, the transaction data associated with a transaction between the mobile device and the POS device and comprising a timestamp;

identify an MPA-funded transaction out of the multiple MPA-funded transactions based at least in part on the location of the mobile device being correlated with the location of the merchant and on a match between the particular time period and the timestamp;

determine that the MPA-funded transaction is authorized based at least in part on a mobile payment account associated with the mobile device; and provide a notification to at least one of the mobile device or the POS device that the MPA-funded transaction is authorized, the notification automatically presented at a user interface.

18. The computing system of claim 17, wherein the user interface is presented at the mobile device, and wherein the notification identifies the mobile payment account and that the MPA-funded transaction has been funded from the mobile payment account.

19. The computing system of claim 17, wherein the user interface is presented at the mobile device, wherein the POS data comprises multiple charge amounts corresponding to the multiple MPA-funded transactions, wherein the computer-executable instructions, when executed by the one or more processors, further configure the computing system to at least:

determine that the timestamp and the correlating of the location of the mobile device with the location of the merchant are insufficient to identify the MPA-funded transaction out of the multiple MPA-funded transactions; and request, based at least in part on the timestamp and the correlating being insufficient, a charge amount of the MPA-funded transaction from the mobile device; and receive, from the mobile device, the charge amount, wherein the MPA-funded transaction is identified based at least in part on a match between the charge amount and one of the multiple charge amounts.

20. The computing system of claim 19, wherein the computer-executable instructions, when executed by the one or more processors, further configure the computing system to at least:

determine that the charge amount is insufficient to identify the MPA-funded transaction out of the multiple MPA-funded transactions;

request, based at least in part on the charge amount being insufficient to identify the MPA-funded transaction, additional transaction data from the mobile device, wherein the additional transaction data comprises at least one of: an identifier of the POS device, a general description of a good or service that is the subject of the MPA-funded transaction, or a specific identifier of the good or service; and receive, from the mobile device, the additional transaction data, wherein the MPA-funded transaction is identified based at least in part on a match between the additional transaction data and data from the POS data.

* * * * *